(12) United States Patent
Shutt

(10) Patent No.: US 7,146,367 B2
(45) Date of Patent: Dec. 5, 2006

(54) DOCUMENT MANAGEMENT SYSTEM AND METHOD

(75) Inventor: Michael J. Shutt, Marietta, GA (US)

(73) Assignee: Advectis, Inc., Alpharetta, GA (US)

( * ) Notice: Subject to any disclaimer, the term of this patent is extended or adjusted under 35 U.S.C. 154(b) by 436 days.

(21) Appl. No.: 10/160,478

(22) Filed: May 31, 2002

(65) Prior Publication Data

US 2003/0217034 A1    Nov. 20, 2003

Related U.S. Application Data

(60) Provisional application No. 60/381,007, filed on May 14, 2002.

(51) Int. Cl.
*G06F 17/30* (2006.01)

(52) U.S. Cl. .................................. 707/9; 707/1; 707/3

(58) Field of Classification Search .................... 707/9, 707/3, 1, 100; 705/35–38
See application file for complete search history.

(56) References Cited

U.S. PATENT DOCUMENTS 6,088,694 A * 7/2000 Burns et al. .................... 707/8
6,105,027 A * 8/2000 Schneider et al. .............. 707/9
6,236,996 B1 * 5/2001 Bapat et al. .................... 707/9
6,314,425 B1   11/2001 Serbinis et al. ................ 707/10
6,678,682 B1 * 1/2004 Jenkins et al. ................. 707/9
6,742,028 B1 * 5/2004 Wang et al. ................. 709/223
6,757,871 B1 * 6/2004 Sato et al. ................... 715/530
2002/0065827 A1 * 5/2002 Christie et al. ............... 707/10
2002/0095432 A1 * 7/2002 Shimomura et al. ........ 707/200
2003/0208477 A1 * 11/2003 Smirniotopoulos et al. .... 707/3

* cited by examiner

*Primary Examiner*—Jeffrey Gaffin
*Assistant Examiner*—CamLinh Nguyen
(74) *Attorney, Agent, or Firm*—Nelson Mullins Riley & Scarborough, LLP

(57) ABSTRACT

A system for managing data items at an electronic data repository with respect to a plurality of parties includes an electronic data repository and a computer processor programmed to receive data items from parties remote from the repository and from each other. The program stores the received data items in the repository. It provides each remote party access only to those data items within one or more data item sets corresponding to the remote party. The program prohibits any remote party from modifying any data item in the repository, and from deleting any data item from the repository, while the data item is part of a data item set of another remote party. A first remote party may access data items in a set corresponding to a second remote party, responsively to the second remote party.

52 Claims, 33 Drawing Sheets

ERRORS/QUEUES

ERROR LOG

INDEXING QUEUES

INFORMATIONAL

SQL QUERY TOOL

BILLING

MAINTENANCE

COMPANY MAINTENANCE ⟵ 72

WEB SITE

RESET VOLUME INFO

RESET APPLICATION VARIABLES

© 2002 ADVECTIS, INC.

*FIG. 5*

USERS FOR COMPANY   COMPANY NAME
CREATE USER

| 76 78 | LOGIN NAME | FIRST NAME | LAST NAME | USER ID | EMAIL |
|---|---|---|---|---|---|
| ✕ ⊶ 🏠 | alog | JOE | SMITH | {BD6834AB-8041-B452-E5BB-675DC06C9DCC} | |
| ✕ ⊶ 🏠 | blog | JOE | JONES | {4B26F446-7D40-3141-EEDF-F3B61FC2E969} | admin@advectis.com |
| ✕ ⊶ 🏠 | clog | JOE | CARTER | {3C88A5B0-C1FE-CC4A-A0E8-888FD605FC33} | |
| ✕ ⊶ 🏠 | dlog | JOHN | SMITH | {78A03A84-F89D-D266-D529-606BB201626C} | |
| ✕ ⊶ 🏠 | elog | JOHN | JONES | {72E19F0D-61A8-50B3-A046-D97EB6578B6E} | |
| ✕ ⊶ 🏠 | flog | JOHN | CARTER | {A19CB76A-E542-3400-1F2C-14EE22311100} | |
| ✕ ⊶ 🏠 | glog | JIM | SMITH | {30C58BBD-3927-5970-CD9C-E7709BBEA465} | |
| ✕ ⊶ 🏠 | hlog | JIM | JONES | {0359CD91-A8B7-DDE2-0567-3D37DDC4719C} | jjones@advectis.com |
| ✕ ⊶ 🏠 | ilog | JIM | CARTER | {70E660AB-6389-9309-4A8F-DEE877474141} | |
| ✕ ⊶ 🏠 | jlog | JAMES | SMITH | {D48FACEE-1040-FA5C-EE77-16C905370131} | |
| ✕ ⊶ 🏠 | klog | JAMES | JONES | {1463203C-A3A5-BE9E-221A-52C0E0531A59} | |
| ✕ ⊶ 🏠 | llog | JAMES | CARTER | {9E8F5C38-79D3-0E6B-2C3D-9064B60E0722} | |
| ✕ ⊶ 🏠 | mlog | JACK | SMITH | {749D5371-7BA0-130F-10BC-FB04AF0210CF} | |
| ✕ ⊶ 🏠 | nlog | JACK | JONES | {EE037624-8F0B-861B-48AA-91BF6778C707} | |
| ✕ ⊶ 🏠 | olog | JACK | CARTER | {A1038A06-DED0-811F-BF78-79AF83ECB860} | |

*FIG. 7A*

| | | | | | |
|---|---|---|---|---|---|
| ✕ ⌐ 📇 | plog | JERRY | SMITH | {99D2EEDD-2E15-E656-18FF-FE5A212AE4BD} | jsmith@advectis.com |
| ✕ ⌐ 📇 | qlog | JERRY | JONES | {753B38A5-7DF9-0AEF-5567-EC2B38796729} | |
| ✕ ⌐ 📇 | rlog | JERRY | CARTER | {F85ED729-C1DE-F57F-BD62-0D773C17710B} | |
| ✕ ⌐ 📇 | slog | JOEL | SMITH | {AF7F77EC-C181-8BFA-CA2C-7A3998A97A04} | |
| ✕ ⌐ 📇 | tlog | JOEL | JONES | {6467C5BD-A207-C676-C310-9C5FE270DA6C} | |
| ✕ ⌐ 📇 | ulog | JOEL | CARTER | {B1180530-D80E-144A-F464-204F355743A4} | |
| ✕ ⌐ 📇 | vlog | JAKE | SMITH | {52C71129-D197-3F23-0145-C370EB2FFD19} | |
| ✕ ⌐ 📇 | wlog —82 | JAKE | JONES | {1E276044-4ED2-322D-6378-CB562A6D429C} | |

<u>CREATE USER</u>
↙
80

© 2002 ADVECTIS, INC.

LEFT-SIDE DOCS (GROUP 1)
- SHIPPING/FINAL DOCS
- LEGAL DOCUMENTS
- ESCROW/TAXES/INSURANCE
- TITLE/PROPERTY
- CLOSING DOCUMENTS
- MISC LEFT-SIDE

RIGHT-SIDE DOCS (GROUP 2)
- UNDERWRITING
- CREDIT
- INCOME/EMPLOYMENT
- ASSETS
- SUBJECT PROPERTY
- INITIAL DISCLOSURES
- INTERNAL ONLY
- CANCELLED/DENIED
- MISC RIGHT-SIDE

DESCRIPTION CLICK TO ADD

90

RESET | CANCEL (RETURN TO GROUP) | SAVE CHANGES

© 2002 ADVECTIS, INC.

*FIG. 10*

USERS NOT ASSIGNED TO ROLE

| USER | CLICK TO ADD TO ROLE |
|---|---|
| CREATOR | [ROLE 1][ROLE 2][ROLE 3][ROLE 4] |

— 96

MEMBER ROLES FOR BASIC SECURITY

| | ROLE # | DESCRIPTION | ACCESS RIGHTS (CLICK TO TOGGLE) | | | | | | FOLDER VIEW | MEMBERS (CLICK TO REMOVE) |
|---|---|---|---|---|---|---|---|---|---|---|
| | | | V | D | A | R | P | S | | |
| X | 1 | EVERYONE | ✓ | – | ✓ | – | ✓ | – | MORTGAGE DOCS | J SMITH A<br>J SMITH B<br>J SMITH C<br>J SMITH D<br>J SMITH E<br>J SMITH F<br>J SMITH G<br>J JONES A<br>J JONES B |
| X | 2 | ADMIN | ✓ | ✓ | ✓ | ✓ | ✓ | ✓ | MORTGAGE DOCS | J JONES C<br>J JONES D<br>J JONES E |
| X | 3 | EXTERNAL | ✓ | – | – | – | – | – | EXTERNAL COMPANY MORTGAGE DOCS | J JONES F<br>J CARTER A |
| X | 4 | VIEW ONLY | ✓ | – | – | – | – | – | MORTGAGE DOCS | J CARTER B<br>J CARTER C |

— 98

ACCESS RIGHTS
V = VIEW
D = DELETE
A = ADD DOCUMENTS
R = REMOVE DOCUMENTS
P = EDIT PROPERTIES
S = EDIT SECURITY

ADD NEW ROLE  |  RESET ↺  |  SAVE CHANGES ⇨

© 2002 ADVECTIS, INC.

FIG. 11

FOLDER SEARCH

BLITZ DOCS™

ON-LINE MORTGAGE DOCUMENTS
POWERED BY BLITZDOCS™ TECHNOLOGY

HOME   SEARCH FOR A FOLDER   CREATE A NEW FOLDER   USER PROFILE   HELP

ENTER SEARCH CRITERIA, USING WILDCARDS (*) AND RANGE MODIFIERS (<, >) WHERE NECESSARY, THEN CLICK SEARCH

MORTGAGE NUMBER       [            ]
U/W                   [            ]
STATUS                [     ▶]
APPLICANT FIRST NAME  [            ]
APPLICANT LAST NAME   [            ]
APPLICANT STATE       [     ▶]
DATE CREATED          [            ]  TODAY
CREATED BY            [            ]  MYSELF

SEARCH ⇨

© 2002 ADVECTIS, INC.

*FIG. 12*

DOCUMENT PROPERTIES

| | |
|---|---|
| DOCUMENT TYPE | PURCHASE CONTRACT AND ADDENDA ▼ |
| TITLE | |
| COMMENTS | |
| DATE CREATED | 3/21/2001 10:55:58 AM |
| CREATED BY | ADVECTIS\ADMIN |
| ADDED TO FOLDER BY | ADVECTIS\ADMIN |
| DOCUMENT SOURCE | UPLOAD |
| HAS BEEN VIEWED | NO   MARK AS VIEWED |
| HAS BEEN VERIFIED | YES |

| RESET ↶ | UPDATE ⇧ |

© 2002 ADVECTIS, INC.

BLITZDOCS FAX COVERSHEET
PRINT THIS PAGE AND USE IT AS A COVERSHEET FOR FAXING DOCUMENTS TO BLITZDOCS
| FAX NUMBER(S):<br>770.111.1111 l 775.222.2222 | PLEASE NOTE:<br>THIS COVERSHEET EXPIRES: 6/10/2002 |
|---|---|
| FOLDER INFORMATION<br>MORTGAGE NUMBER 12345 | DOCUMENT TYPE<br>HOUSE TO SELL |
*610* ← 130
*R0CF4*
*VATKB*
*GBRO2*
*Z2BIO*
*YXWJP*
*CROCB*
© 2002 ADVECTIS, INC.
FIG. 19

SCANNING BATCH COVERSHEET

PRINT THIS PAGE AND USE IT AS A BATCH COVERSHEET FOR SCANNING DOCUMENTS TO THE SPECIFIED FOLDER

FOLDER INFORMATION
MORTGAGE NUMBER: 12345

TO USE THIS BATCH COVERSHEET, PLACE IT AS THE FIRST PAGE OF A SCANNING BATCH AND PLACE DOCUMENT COVERSHEETS IN FRONT OF EACH DOCUMENT IN THE BATCH

RELATED BARCODE SHEETS:
MORTGAGE DOCUMENTS DOCUMENT SEPARATOR SHEETS
FILE COMPLETED NOTIFICATION BARCODE SHEET

© 2002 ADVECTIS, INC.

*FIG. 20*

DOCUMENT TYPE COVERSHEETS FOR SCANNING

DOCUMENT TYPE LIST: [MORTGAGE DOCUMENTS ▶]

SELECT THE DESIRED DOCUMENT TYPES, THEN CLICK SUBMIT TO GENERATE THE DOCUMENT COVERSHEETS

| | | |
|---|---|---|
| ☐ 1003 | ☐ HAZARD INSURANCE | ☐ SIGNED COMMITMENT LETTER |
| ☐ 1008 | ☐ HOUSE TO SELL | ☐ SIGNED CREDIT AUTHORIZATION |
| ☐ APPRAISAL | ☐ INCOME | ☐ SIGNED DISCLOSURE DOCUMENTS |
| ☐ ASSETS | ☐ MIC/LGC | ☐ STATEMENT OF CREDIT DENIAL |
| ☐ ASSIGNMENT | ☐ MORTGAGE | ☐ TAX RETURNS AND SCHEDULES |
| ☐ CREDIT DOCUMENTS | ☐ OTHER | ☐ TITLE COMMITMENT |
| ☐ FLOOD CERTIFICATE | ☐ PURCHASE CONTRACT AND ADDENDA | ☐ TITLE POLICY |
| ☐ FLOOD INSURANCE | ☐ SIGNED CLOSING DOCUMENTS | ☐ W-2 FORMS |

©2002 ADVECTIS, INC.

140

| SELECT ALL ☑ | CLEAR ALL ☐ | SUBMIT ⇨|

FIG. 21

DOCUMENT COVERSHEETS
PRINT THESE PAGES AND USE THEM AS A COVERSHEETS FOR SCANNING DOCUMENTS
DOCUMENT TYPE LIST: MORTGAGE DOCUMENTS
DOCUMENT TYPE: HOUSE TO SELL
*311*
*6*
© 2002 ADVECTIS, INC.
FIG. 22

| FOLDER SEARCH | | |
|---|---|---|
| MORTGAGE NUMBER | | |
| APPLICANT FIRST NAME | | |
| APPLICANT LAST NAME | | |
| APPLICANT STATE | ▷ | |
| DATE CREATED | | |
| CREATED BY | | |
| | SEARCH | CLOSE |

© 2002 ADVECTIS, INC.

*FIG. 24*

FOLDER SEARCH RESULTS

| MORTGAGE NUMBER | APPLICANT FIRST NAME | APPLICANT LAST NAME | APPLICANT STATE | DATE CREATED | CREATED BY |
|---|---|---|---|---|---|
| 12345 | JOE | SMITH | GA | 01-25-2001 | SAMPLEDEMO |
| 88745 | ALBERT | AARRON | AK | 01-25-2001 | SAMPLEDEMO |
| 101054 | BILL | BATES | IN | 01-25-2001 | SAMPLEDEMO |
| 1789 | COREY | CASEY | PA | 03-21-2001 | SAMPLEDEMO |
| 656565 | DANIEL | DONNER | IL | 06-21-2001 | SAMPLEDEMO |
| 4755873 | EDDIE | EATON | IA | 06-21-2001 | SAMPLEDEMO |
| 101055 | FRANK | FORTSON | CA | 06-21-2001 | SAMPLEDEMO |

SELECT   CLOSE   NEW SEARCH

RESPONSE COMPLETED

© 2002 ADVECTIS, INC.

*FIG. 25*

BLITZ DOCS™

FOLDER VIEW  EDIT ATTRIBUTES  NOTIFICATIONS  FAXING  SCANNING  UPLOAD DOCUMENT  SEARCH FOR A FOLDER
                                                                                  CREATE A FOLDER
                                                                DOWNLOAD DOCS  E-MAIL LINK  HELP

UPLOAD DOCUMENT TO FOLDER

MORTGAGE NUMBER: 12345

DOCUMENT INFORMATION

☐ FILE CONTAINS COVERSHEETS

DOCUMENT TYPE: [1003 ▼]

TITLE: [_____]

COMMENTS: [_____]

FILE: [_____] [BROWSE] ～154

| UPLOAD ⇨ |

©2002 ADVECTIS, INC.

*FIG. 26*

USER INFORMATION

LOGIN NAME   ADVECTIS\GUEST

USER ID   1C84672E-B675-4ac2-B01F-C2ADD0072BF4

FIRST NAME

LAST NAME

E-MAIL ADDRESS

| RESET ↵ | UPDATE ⇧ |

CHANGE PASSWORD

NEW PASSWORD

CONFIRM

| CHANGE ⇧ |

©2002 ADVECTIS, INC.

*FIG. 29*

DOCUMENT MANAGEMENT SYSTEM AND METHOD

The present application claims the benefit of U.S. provisional application Ser. No. 60/381,007, filed May 14, 2002, the entire disclosure of which is hereby incorporated by reference herein.

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright whatsoever.

BACKGROUND OF THE INVENTION

The present invention relates generally to systems and methods for electronically managing information.

It is common in business transactions involving multiple parties for the parties to share documents generated in the transaction. Typically, one or more parties make hard copies of various documents, distribute them as needed and revise documents as the transaction proceeds. Accordingly, it may be difficult at any given time to identify the currently valid document or for any two remote parties to be sure that their respective copies of a given document are the same.

Document imaging, storage and management systems are known. Generally, however, these systems are internal to a given party and do not provide document access to other parties. Furthermore, it is also known for a business entity to establish an extranet by which its clients and customers can access information placed on the extranet by the party. Generally, however, these systems are controlled entirely by the host party. The external parties cannot add documentation, and they cannot be sure of the consistency of the documents they review on the extranet over time.

SUMMARY OF THE INVENTION

The present invention recognizes and addresses the foregoing considerations, and others, of prior art constructions and methods.

Accordingly, it is an object of the present invention to provide an improved system and method for managing data items, for example documents involved in a transaction.

This and other objects are achieved by a system for managing data items at an electronic data repository with respect to a plurality of parties. The system includes an electronic data repository and a computer processor programmed to receive data items from parties remote from the repository and from each other. The program stores the received data items in the repository. It provides each remote party access only to those data items within one or more data item sets corresponding to the remote party. The program prohibits any remote party from modifying any data item in the repository, and from deleting any data item from the repository, while the data item is part of a data item set of another remote party. A first remote party may access data items in a set corresponding to a second remote party, responsively to the second remote party.

In a computerized method for managing data items at an electronic data repository with respect to a plurality of parties, data items are received from parties remote from the repository and from each other and are stored in the repository in an electronic format. Each remote party is provided access only to those data items within one or more data item sets corresponding to the remote party. Remote parties are prohibited from modifying any data item in the repository, and from deleting any data item from the repository, while the data item is part of a data item set of another remote party. A first remote party is permitted access to data items in a set of a second remote party, responsively to the second remote party.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended Figures, in which:

FIG. 5 is an exemplary administrator screen display for use in an embodiment of the present invention;

FIG. 7 is an exemplary administrator screen display for use in an embodiment of the present invention;

FIG. 9 is an exemplary administrator screen display for use in an embodiment of the present invention;

FIG. 10 is an exemplary administrator screen display for use in an embodiment of the present invention;

FIG. 11 is an exemplary administrator screen display for use in an embodiment of the present invention;

FIG. 12 is an exemplary user screen display for use in an embodiment of the present invention;

FIG. 16 is an exemplary user screen display for use in an embodiment of the present invention;

FIG. 17 is an exemplary user screen display for use in an embodiment of the present invention;

FIG. 19 is an exemplary fax cover sheet generated by and for use in an embodiment of the present invention;

FIG. 20 is an exemplary scanning cover sheet generated by and for use in an embodiment of the present invention;

FIG. 21 is an exemplary user screen display for use in an embodiment of the present invention;

FIG. 22 is an exemplary scanning cover sheet generated by and for use in an embodiment of the present invention;

FIG. 24 is an exemplary screen display for use in an embodiment of the present invention;

FIG. 25 is an exemplary screen display for use in an embodiment of the present invention;

FIG. 26 is an exemplary screen display for use in an embodiment of the present invention;

FIG. 29 is an exemplary screen display for use in an embodiment of the present invention.

Figure 1:
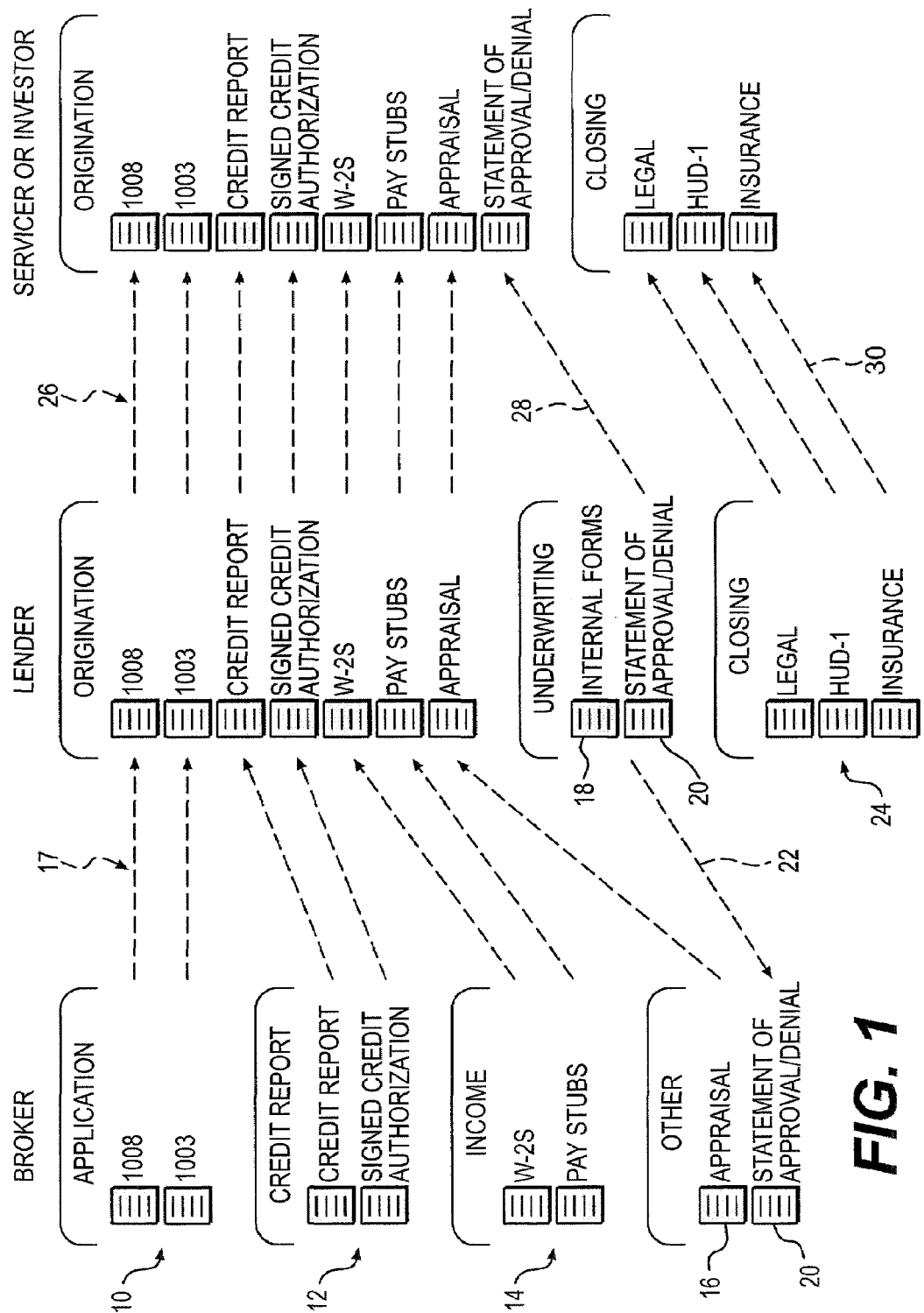
FIG. 1 is a schematic illustration of an example of a document type and group definition for remote parties to a transaction which might be used in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the invention.

One or more embodiments of the invention described below operate within a distributed computing environment. Those of ordinary skill in this art should understand that the examples described below are provided for purposes of illustration only and that the present invention may be embodied in various suitable environments.

A distributed computing environment generally includes multiple memory storage and computing devices located remotely from each other. Execution of program modules may occur at these remote locations as data is transferred among the memory devices and by and between the computing devices over an extended network.

Generally, the present invention is described herein as used by remote parties. This does not refer to the parties' physical relationship, but instead indicates that the parties do not have control over a repository database(s) in which documents are stored or the server that controls the repository database. In addition, the parties may be remote from each other, not necessarily indicating spatial separation, but instead indicating that no party has control of another party's database or of a server that controls the other party's database. Thus, the parties control only their access to documents in the repository database(s), not the integrity of the stored documents themselves.

Communication among such parties may be, for example, through the Internet, which is a global accumulation of computing devices that communicate through an information retrieval system, most commonly the World Wide Web (hereinafter "Web"). It should be understood, however, that an Internet-based system is merely one example of a suitable construction and execution of the present invention. For example, remote parties may also communicate among the parties' individual local or wide area networks through a private network structure.

Certain operations and processes described herein are executed by one or more computers within a distributed computing network. As should be well understood, a computer transforms information in the form of electronic signals input into the computer to a desired output. The input may be provided by a human operator, another computer, or from other external stimuli. To accomplish these functions in one computing environment, a conventional personal computer includes a processor, read-only and random-access memory, a bus system and an input-output system to transfer information within the personal computer and to interact with external devices. The computer's memory includes an operating system and various application programs that run on the operating system. Application programs may be added to memory from external devices, for example through the Internet, and may be run on the operating system from an external device or from a device hosted by the computer, for example a disk drive or CD ROM drive.

The computer's memory may include an application program for browsing the World Wide Web. The browser, which may reside on a server in a local area network or in a stand-alone computer, establishes communication between a Web server and the computer. In response to receipt of a Uniform Resource Locator ("URL"), the browser establishes a network path to a Web server identified by the URL. Once connected, the computer and the Web server may communicate with each other using the Hypertext Transfer Protocol ("http"). For example, the Web server may transfer Web pages, including text and graphic images, and sound and video files using a standard description language such as Hypertext Markup Language ("html"). The Web page may provide "links" to other files and to other servers. The links may be provided as options to the user so that the user may choose to execute the link, or an application program operated by the computer may execute the link without the user's knowledge. The application program may be hosted by the Web server or by a network driven by the Web server and operated by the user over the Internet through the Web browser. The Web server in such an environment is located at an application service provider ("ASP"), an arrangement that should be well understood by those skilled in this art.

It should be understood that the Web server may dynamically produce Web pages by script execution or may transmit scripts or other programs for execution by the Web browser. It should also be understood that communication between the host and client sites may be effected through html, xml or other suitable data format.

A. System Overview

The present invention is described herein within the context of mortgage transactions. It should be understood, however, that this is provided by way of example only and that the present invention may be used in managing electronic data items within other types of environments. Existing home owners and home buyers typically obtain mortgages through direct contact with a lender or through a mortgage broker. Where a broker is used, and referring to FIG. 1, a mortgage broker initially requests that the loan applicant complete loan application documents, indicated at 10, which may include federally standardized forms. The broker also obtains credit report documents 12, which may include a report of the applicant's credit worthiness and an authorization document signed by the applicant providing the broker permission to obtain applicant's credit information and to provide applicant's credit information to lenders and other parties involved in the mortgage transaction.

Ultimately, the broker attempts to match the home owner or buyer with a lender. From application documents 10 and credit report documents 12, a broker may be able to determine which lenders are most likely or best suited to provide a mortgage to the applicant. The various lenders, however, may require somewhat different documentation, and the broker may therefore require varying information and papers from the applicant depending on which lender the broker initially contacts. Typically, however, lenders require income-related documents 14, for example W-2 forms and pay stubs, and a property appraisal 16.

The broker provides these documents to the lender, as indicated by the right-pointing arrows 17, who in turn puts together a loan origination package. In the subsequent underwriting process, the lender may additionally generate a variety of forms 18 solely for its internal use. After determining whether it wishes to grant or deny the loan, the lender generates an approval/denial statement 20. The lender provides a copy of the approval/denial statement to the broker, as indicated by arrow 22, so that the broker may notify the mortgage applicant. If the loan is approved by the lender, the broker's role is largely complete, and there is therefore little or no document sharing between the broker and other parties as the mortgage transaction proceeds. If, however, the loan is denied by the lender, the broker typically contacts a different lender, repeating the process until a lender is found that will approve the application. It should be noted that any party that reviews the documentation associated with an application is required to maintain copies of those documents for some period of time as required by the applicable regulations. In other words, any lender that reviews an application must keep copies of the application documents regardless of whether that lender ultimately approves the loan. The same requirements apply to a broker, regardless of whether that broker is ultimately able to locate a suitable lender.

Assuming the lender approves the mortgage request, the lender prepares various documents 24 executed between the applicant and the lender at closing of the mortgage.

If the lender maintains the mortgage in-house, the lender continues to manage the mortgage until resolved by the applicant. Often, however, lenders sell loan packages to larger investors such as FREDDIE MAC or FANNIE MAE. Alternatively, a lender may outsource the mortgage to a service provider that handles collection of the home owner's mortgage payments for an agreed-upon fee. In either case, the investor typically requires origination and closing documents from the lender in order to assess the advisability of taking the mortgage, as indicated at 26 and 30. The investor may require at 28 the approval/denial statement as part of its origination documents, although it typically would not be provided the lender's internal underwriting documents.

Figure 2:
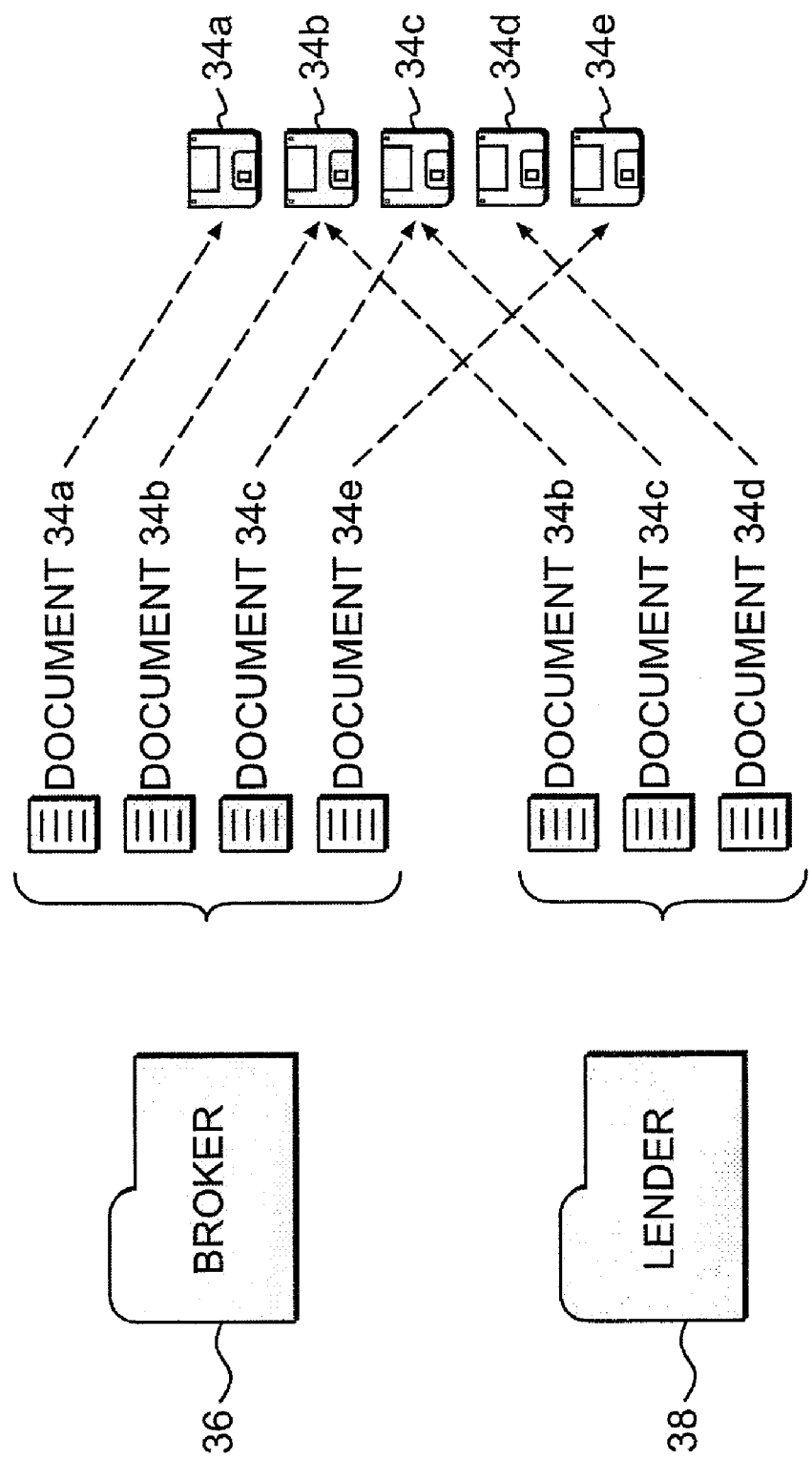
FIG. 2 is a schematic illustration of an example of a document sharing relationship effected by one embodiment of the present invention.

As described in more detail below, in a preferred embodiment of the invention, an image or other electronic format of each of the documents in FIG. 1 is stored in a single repository, which may comprise a single server and database site or multiple servers and/or databases, indicated at 32 in FIG. 2. For purposes of simplicity, FIG. 2 illustrates only five documents 34a–34e, although it should be understood that all documents shown in FIG. 1 may be stored at the repository. Similarly, FIG. 2 illustrates only two remote parties, for example broker 36 and lender 38, although it should be understood that various other parties may be included.

Both parties to the transaction store documents to, and view documents in, the repository over a remote connection such as the Internet, as indicated by arrows 40. As shown in FIG. 2, for example, broker 36 has saved documents 34a, 34b, 34c and 34e. Lender 38 has stored document 34d. Once stored in the repository, neither party, even the party that initially created and stored the document, can delete the document from the repository if access to that document is required by another party. Likewise, once a document is added to the repository, it is not possible for any party to revise or replace that document. A revised version can, however, be stored as a new document.

When a party requests a document from the repository, the system host server provides a Web page displaying an image (e.g. in PDF format) of that document to the party. Each transaction party may define an organization by which the system presents the document images to one or more users at the transaction party site. Such an organization is referred to herein as a "view" and, as described in more detail below, each party may organize documents into document types which are in turn organized into document groups. Thus, each party may organize its access to the repository documents into groups that suit its needs. That is, in its view(s), the repository documents to which the party's users have access are organized in a manner suitable to how that party conducts business.

In the preferred embodiment described herein, the document organizations defined within a given party's views do not affect the organization of the documents in the repository. Each party's users view the repository documents as if they were grouped according to the party's particular needs. Referring to the example provided in FIG. 1, each column represents the respective views of the broker, lender and investor to the documents stored in the repository. The repository, however, contains only a single document image for each indicated document. That is, the repository contains only a single instance (in an image or other electronic format) of the Form 1008 document shown in each view.

A view may be unique to the transaction party. The broker in FIG. 1, for example, organizes its view into groups identified as application documents, credit report documents, income documents and other documents. Each group is associated with one or more document types, for example Forms 1008 and credit reports. From the lender's perspective, however, all of these document types relate to loan origination and are therefore grouped in its view under an "origination" group. For its part, the lender categorizes certain other documents as relating to underwriting and closing—groups not applicable to the broker.

As described in more detail below, a party storing a document into the repository may grant access to that document to any other party, and the system maps the document images from the source party's view to the receiving party's view. Once a party has been granted access to a document, it may likewise grant access to any other party, regardless of whether the former party initially stored the document in the repository. Accordingly, document access may be established as needed during a transaction's progression, even though the transaction moves beyond the originating party.

Once a party has access to a document in the repository, the party may remove the document from its view, but this does not affect access to that document by the other parties. In one preferred embodiment as described herein, no single party controls when a document is deleted from the repository. Thus, "removal" of a document as described in the example below refers to deletion of access to a particular document only from that party's view. After deletion, if the party wishes to re-establish the document within its view, another party currently having access to the document may provide access. If and when all parties have removed a particular document from their respective views, the system may purge the document from the repository at its discretion.

Figure 3:
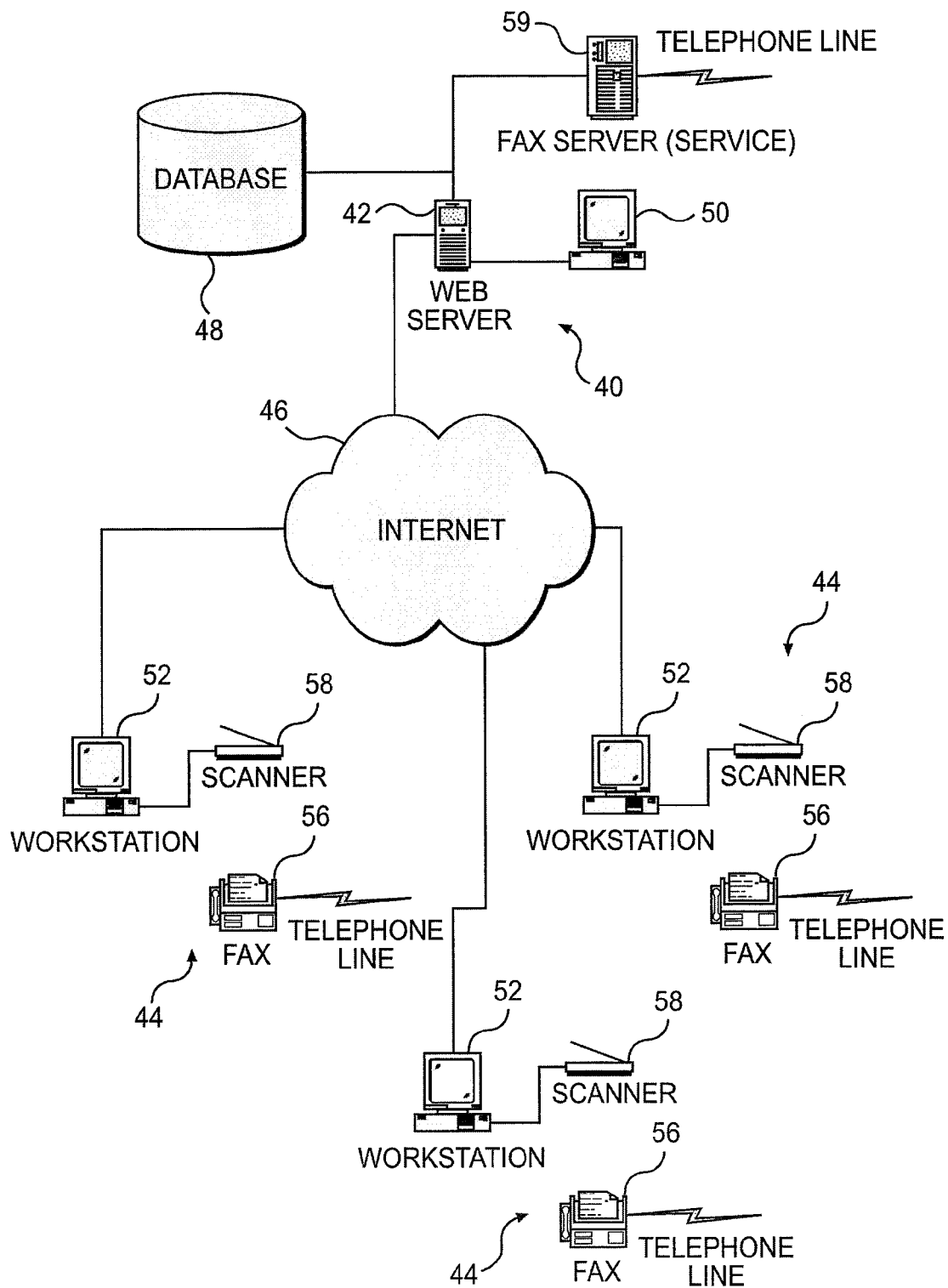
FIG. 3 is a diagrammatic view of a document management system according to an embodiment of the present invention.

FIG. 3 illustrates one exemplary environment of the present invention in which remote parties communicate with the repository over the Internet. A host system 40 hosts server-side software at a primary server 42 with which a plurality of client work stations 44 communicate via the Internet 46. In one embodiment, primary server 42 includes dual 750 MHz PENTIUM III processors, with 2 gigabyte RAM and RAID5 storage. Server 42 stores and manages data through an SQL database 48. Database 48 is separated from server 42 for purposes of illustration, although it should be understood that the database and server can be embodied by the same hardware. The repository may generally be considered to include the SQL server database, document storage and document images. An administrator may communicate with server 42 and database 48 through an administrator workstation 50, for example a personal computer.

Client systems 44 may each include a workstation 52. Workstation 52 may be, for example, a personal computer supporting an Internet browser such as Internet Explorer 5.0, or higher version, available from MICROSOFT CORPORATION. In the presently described embodiment, workstation 52 also supports software for viewing PDF format images, such as an ADOBE ACROBAT reader.

A transaction party may store documents in the repository at database 48 through its workstation 52. The transaction party may acquire the image through any suitable means, for example via a fax machine 56, a scanner 58 or through uploading an existing electronic document from another storage device.

Figure 4:
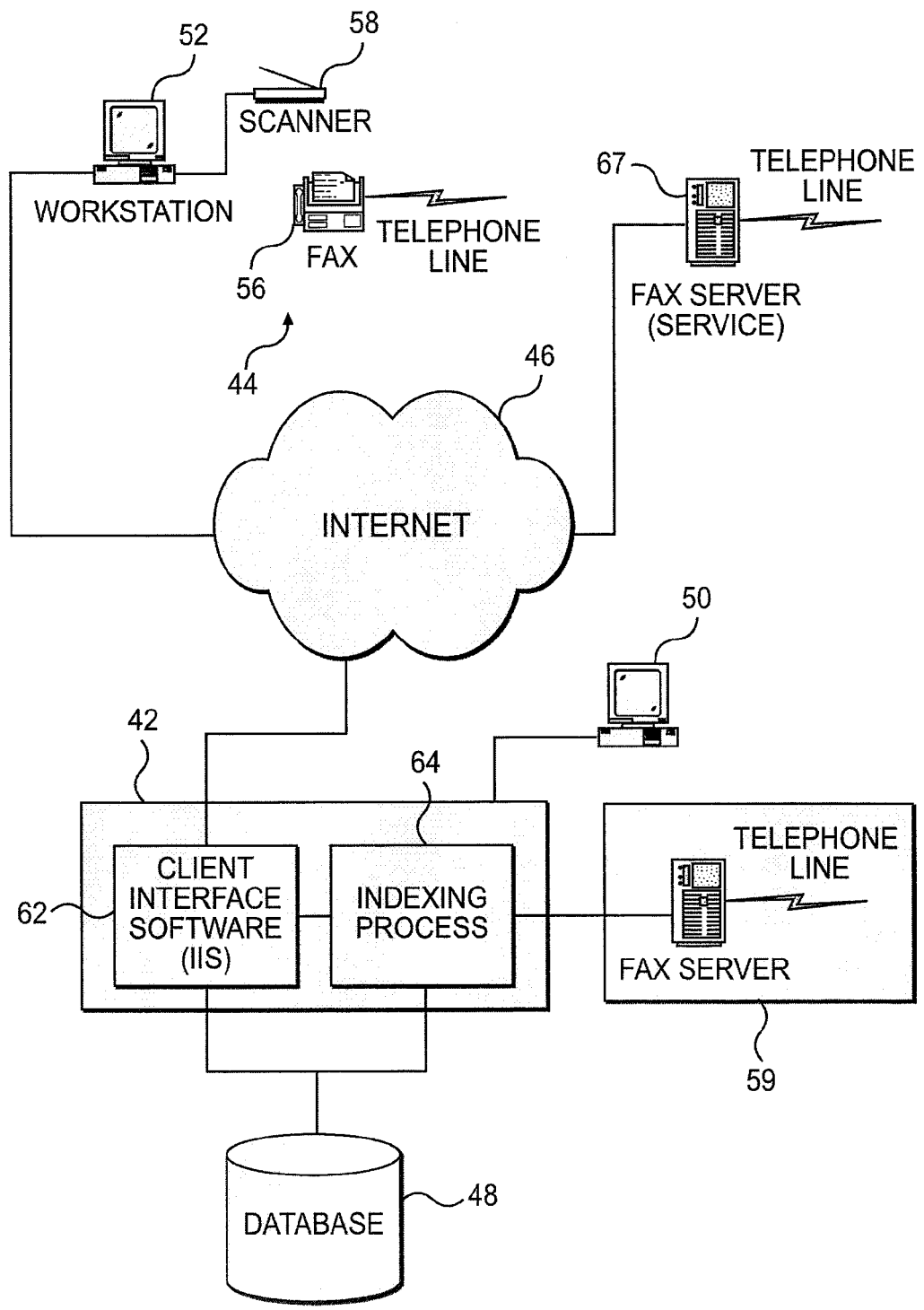
FIG. 4 is a diagrammatic view of a document management system according to an embodiment of the present invention.

FIG. 4 illustrates in block diagram form the administrative software housed at primary server 42. For purposes of clarity, only one client workstation 44 is illustrated. Primary server 42 houses client interface software 62, for example written in VISUAL BASIC SCRIPT, that is executed by a MICROSOFT IIS Web Server to generate Web pages that are downloaded to client systems 44 and through which the transaction parties communicate with host system 40. Working through such Web pages, the transaction parties may request that the host system retrieve a document image stored in the repository. Responsively to such a request, client interface software 62 executes appropriate queries against database 48. Retrieving the document image, client interface 62 downloads the image to the appropriate client workstation 52 in a Web page through Internet 46.

As described below, a transaction party may submit a document to the system in any suitable format, for example an image or other electronic file generated by fax, scan or electronic download. For each document, the transaction party provides a document type and destination folder (described below), although additional information may also be provided. In the presently-described embodiment, the transaction party may submit the document image in a multi-page TIF format, optionally using bar codes to provide required information such as the document type and the destination folder. In the case of a scanned image, local software at client workstation 52 combines data read from bar codes with data provided interactively by the user and sends the scanned TIF image to the host server along with the data identifying the document type, destination folder, the transaction party, and the date and time. The host server passes the file to indexing process 64 (which may be written in VISUAL BASIC and C++), which in turn stores the document image in database 48 in association with a document number, an origination date and the folder defined by the originating transaction party and in which the document image will thereafter appear.

In the event a transaction party faxes a document image from a fax machine 56 to fax server 59 through a dial-up connection, the fax is received through a modem connection by a fax server code module. The fax server code is built, for example, from a FAXMAN tool kit available from Data Techniques, Inc. The fax server code communicates the faxed TIF file directly to the indexing process. Alternatively, client fax machine 56 may fax the document image to a fax service provider 67. The fax service provider then emails the document image file and its associated data to the host server through the Internet 46. The server passes the file to indexing process 64 similarly to scanned images.

In the event a transaction party uploads an image document from a source other than fax machine 56 or scanner 58, client workstation 52 transfers the image to the host server over the Internet 46 through an http or https connection. The host server then provides the image to indexing process 64.

A single multi-page TIF file may include multiple documents. In such a file, each document is identified by a separate bar code, which may be printed directly on the first page of the document or may be located on a separate coversheet immediately preceding the first page of the document. Accordingly, indexing process 64, responsively to the information provided by the bar codes, separates the file into individual document images for storage in database 48.

In the presently-described embodiment, indexing process 64 stores all documents to database 48 in PDF format. It should be understood, however, that documents could be stored in various other suitable formats. Upon receiving TIF files of scanned or faxed images, indexing processor 64 translates the TIF document images into PDF files. Similarly, if files uploaded from other sources are not in PDF format, indexing process 64 translates such files, provided the indexing process recognizes the format of the received file. File translation processes should be well understood and are, therefore, not described herein.

B. System Operation

Referring again to FIG. 3, a system administrator may communicate with server 42 through an administrator workstation 50, either through a direct connection as shown in FIG. 3 or through an Internet connection. The system initially prompts the administrator for a username and password. Upon successfully providing this information, server 42 presents the administrator with an options screen shown in FIG. 5. An "error log" button allows the administrator to view system errors logged by server 42. An "indexing queues" button allows the administrator to view file queues in indexing process 64 in which the indexing process is translating scanned TIF files into PDF format files. An "SQL Query Tool" button allows the administrator to create and execute database commands against database 48. Buttons are also provided by which the administrator may review company billing information and perform Web site maintenance. For purposes of clarity, such system management functionality is not discussed in detail herein but should be understood by those skilled in this art.

Figure 6:
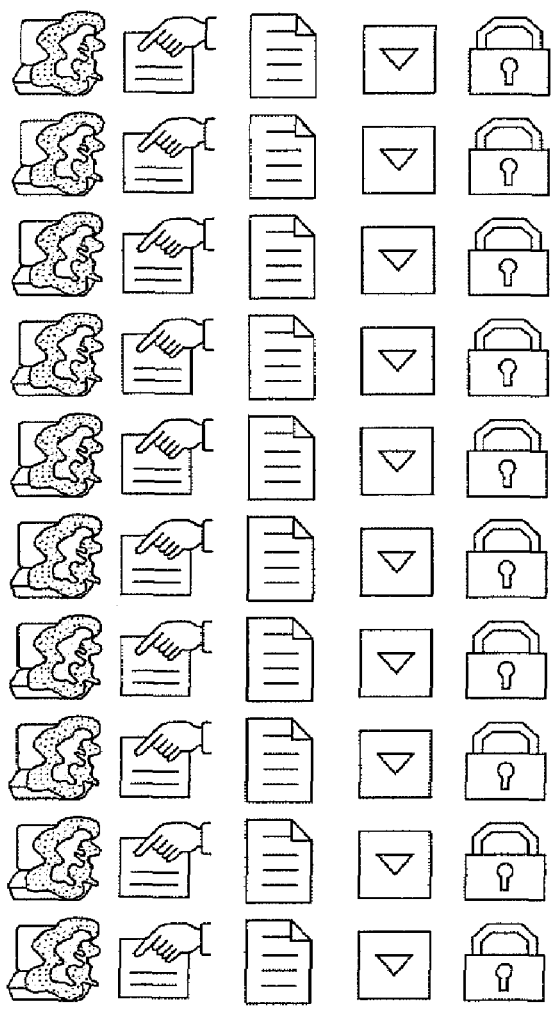
FIG. 6 is an exemplary administrator screen display for use in an embodiment of the present invention.

A "Company Maintenance" button 72 presents a company list screen shown in FIG. 6. The company list screen includes a line for each client entity (in the mortgage example, the lender, broker, etc.) registered with the primary system for storing and managing documents. To the left of each company name are five icons that enable the administrator to view and update system settings for each company. If the administrator activates an icon 74 for a listed company, the primary server 42 (FIG. 3) presents a screen shown in FIG. 7 that lists all users authorized to access documents stored for the company. As shown in FIG. 7, the system stores each user's first name, last name and a login name. A user logging into the system presents a user name that is a combination of its company name and the login name shown in FIG. 7. A User ID, which the system automatically creates when a user is added, is also listed, as is the user's email address. A "delete" icon 76 allows the administrator to delete the user from access to the client's documents. An icon 78 presents a screen by which the administrator may reset the user's password. In the presently-described embodiment, user information is stored by SITE SERVER, available from MICROSOFT CORPORATION. SITE SERVER is also responsible for authenticating all requests to the Web Server. For each user, the SITE SERVER database provides a Globally Unique Identifier (GUID) as the User ID, which can be subsequently used to store and retrieve information related to the user in the repository database. It should be understood, however, that the system could use any suitable user database and authentication sub-system, such as Active Directory from MICROSOFT CORPORATION.

Figure 8:
FIG. 8 is an exemplary administrator screen display for use in an embodiment of the present invention.

A "Create User" button 80 presents a screen shown in FIG. 8 through which the administrator may create a new user. The screen provides entry blanks for the information shown in the screen of FIG. 7. If the user has requested a specific password, the administrator may enter the password in the blank provided in FIG. 8. If not, the administrator may cause the system to randomly generate a password through activation of a screen button 84. Activation of a "Create" button at the bottom of the screen stores the user in the system database, and the user thereafter appears on the user screen shown in FIG. 7 for that client.

Returning to FIG. 7, activation of an icon 82 permits the administrator to change the information shown for that user in FIG. 7. The system presents a screen similar to that shown in FIG. 8, except that the current user information populates the property fields. After changing any information as desired, the administrator may activate an "update" button to modify the user information in the database and as shown on the screen in FIG. 7.

Figure 9:
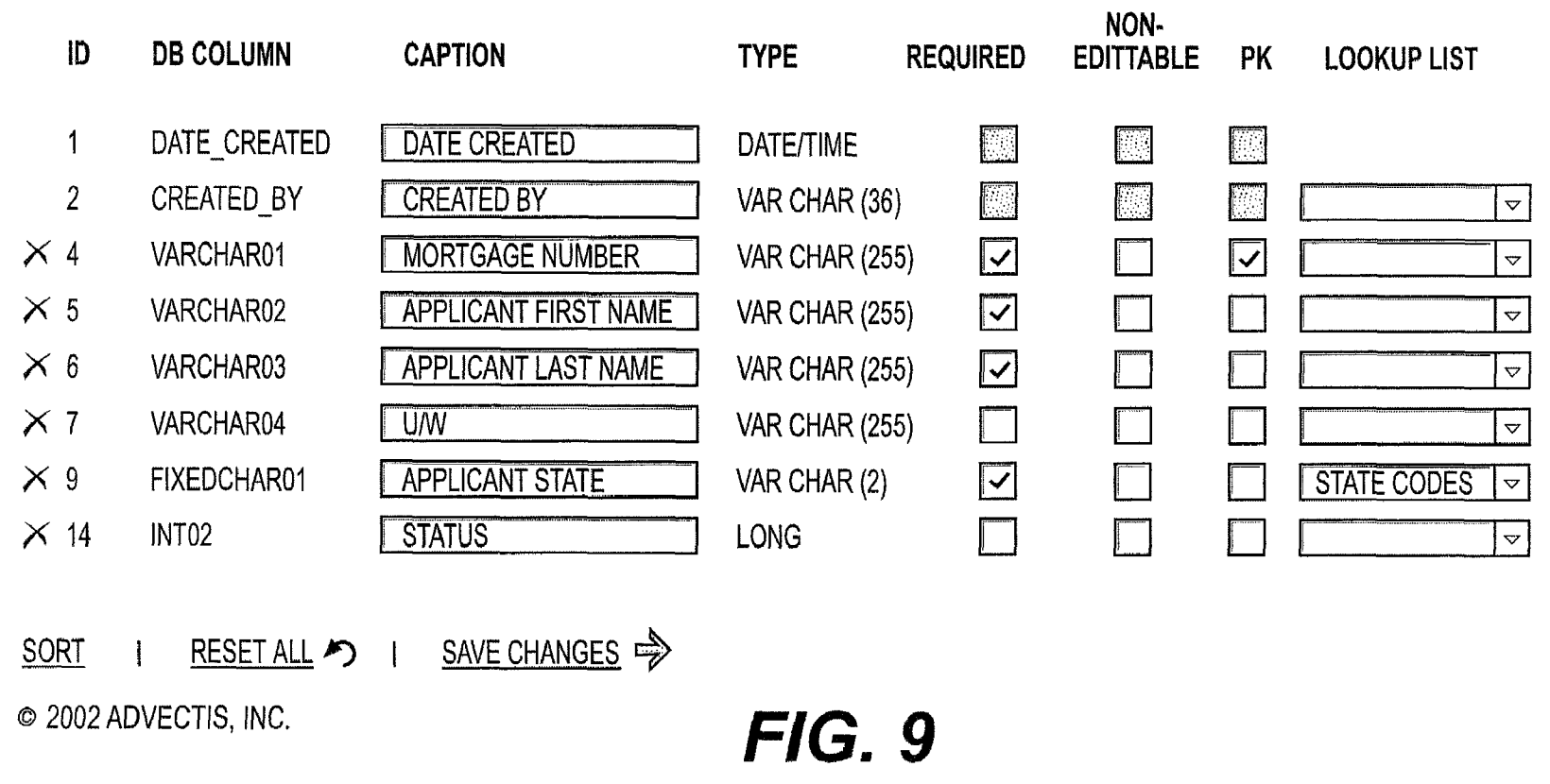

Returning to FIG. 6, activation of a "company folder attributes" icon 86 presents a screen shown in FIG. 9 through which the administrator may define attributes for all folders set up for the particular client. In the presently-described embodiment, a "folder" refers to a group of document images relating to a single transaction, for example a mortgage. Thus, a transaction party defines a folder in the system for each transaction. A party may populate optional or required data fields to describe its folders that define its attributes, or data structure, for each folder stored in the database for the party.

A transaction party defines the attributes of its folders through the primary system administrator, although it should be understood that this task could also be effected by the transaction party at its workstation through screens provided by the client interface. Through the screen shown in FIG. 9, the administrator may review the attributes of the selected party's folders. In the presently-described embodiment, each transaction party has a single set of folder attributes. That is, while the party may establish multiple folders, each folder is defined by the same parameter set. It should be understood, however, that the system may be configured to permit definition of multiple sets of folder attributes. In that case, the user selects a desired folder type when searching for or opening folders.

An exemplary set of folder attributes for a mortgage transaction is illustrated in FIG. 9. The first two fields, folder creation date and folder author, are system-maintained folder attributes and may not be edited. The remaining fields are populated as desired by the transaction party. In this example, the additional fields are mortgage number, applicant first and last names, underwriter name, applicant state and application status. Through the administrator, the applicant may choose any desired caption for each field and may define whether the field is required by checking a box in the "required" column in the field line. If a field is required, the system will require that a transaction party enter this information before setting up a new folder in the database. If the party attempts to set up a folder without required information, the system prompts the party for the field data. If the "non-editable" box is activated for a given data field, the transaction party will be unable to edit data entered for that field in a given folder once the folder is set up. Activation of the "PK" box for a given data field indicates that data entered in that field must be unique among all folders for the transaction party. In the mortgage example discussed above in which each folder represents a different mortgage, each folder must have a unique number.

The system may support one or more look-up lists that may be provided to the transaction party as the means by which to provide data for a given data field. If it is desired to provide a look-up list for a given data field, the administrator selects the desired list from a higher-order look-up list at the right hand column of FIG. 9. In the example shown in FIG. 9, a party setting up a mortgage folder may select the applicant's state from a look-up list of state postal codes. As should be apparent, the type and number of look-up lists provided as options in file set-up will depend upon the type of transaction in which the folder will be used and may be defined as appropriate.

The system may support a plurality of pre-defined data field format lines which a user may use to define a folder attribute. Each includes an ID number, a column description, a caption field, a type description, a look-up selection box and boxes for required, non-editable and PK definitions. Each format line may include a data entry field in a desired format, e.g. a desired number of integers or character spaces. When the administrator initially sets up a folder for a transaction party, the screen shown in FIG. 9 includes only the first two data fields. The remaining data fields are provided in a separate screen (not shown), which may be provided in the same window adjacent or below the screen shown in FIG. 9. To add an attribute to the folder definition, the administrator clicks on the desired data format line, and the system inserts the line into the screen shown in FIG. 9. Un-selected data lines remain in the side area and are available if the user later wishes to edit its folder structure. To delete an attribute, the administrator clicks on an "X" icon to the left of the ID number for the desired data line. After adding an attribute, the administrator fills in the data caption field and checks the option boxes as appropriate. A "save changes" button saves any changes made by the administrator to the folder attributes in the database. A "reset all" button clears the caption fields and option boxes for all attributes.

As described in more detail below, folder attributes and associated values are displayed from various web pages. The sorting order in which system presents the data fields to the client transaction party can vary from page to page. The system allows each party to define sorting orders for three different uses: search criteria; search results; and basic information. These three defined sorting orders are then used as appropriate by the different web pages to sort the folder attributes that are presented.

Returning to FIG. 6, activation of an icon 88 for a given company displays a screen (not shown) listing each of the views defined for that party's folders. As indicated above, each folder defined by a transaction party corresponds to a given transaction. When the administrator initially enters the transaction party in the database, the transaction party specifies one or more lists of document types it expects to handle in its transactions. The administrator defines these document type lists in the database in association with that party. Additionally, each party can define one or more folder views used to organize a folder's contents when presenting the folder's information to a user. For each view, the party provides one or more desired document groups. From each document type list, the party specifies which document types should be placed into which document type groups defined for each view and in which order the document types should be sorted within the respective groups. All of this information is stored by the administrator in the database in association with the transaction party.

As discussed above, a view may include one or more document groups and one or more document types for each group. Referring to FIG. 1, for example, a mortgage broker may group documents into application documents, credit report documents, income documents and other documents. Within the application group, the broker might define forms 1008 and 1003 as document types.

From the view list screen (not shown), the administrator may activate a button to create a new view for the folders of the selected transaction party. A view creation screen (not shown) permits the administrator to define document groups and types for a view.

If the administrator clicks on one of the views in the view list screen, the system presents a screen shown in FIG. 10 listing the selected view's document groups and document type-to-group mappings. As should be understood by those in the mortgage industry, hard-copy documents are typically maintained on the left or right side of a mortgage file. Documents are commonly referred to as either "left-side" or "right-side" documents, and the exemplary view shown in FIG. 10 defines two document groups according to this convention.

For example, from the view list screen (not shown), the administrator may click on one of the listed views to present a screen such as shown in FIG. 10. The screen lists each of the pre-defined groups and each of the document types defined for the group. In the illustrated example, all available document types are defined for the existing groups. Any unused document types, however, would be listed in an area 90 to the right of the view description shown in FIG. 10. To add an unused document type to the group for which it is defined, the administrator simply clicks on the document type in area 90, and the system inserts the document type at the bottom of the list for its document group. To delete a document type currently listed for a group, the administrator activates the "X" icon to the left of the document type, and the system moves the document type to area 90. The order of the document types within a group may be changed through activation of the up and down arrows to the left of the document types in the list. Once the administrator completes its changes to the view, the changes may be saved to the database through activation of a "save changes" button at the bottom of FIG. 10. A "reset" button removes un-saved changes from the screen shown in FIG. 10.

From the view list screen, the administrator may define a new view by activating an appropriate button on the screen to present a screen similar to the screen shown in FIG. 10. All document types, however, are listed in area 90, and the left-hand side of the screen contains only the document groups. The administrator may then define each group by clicking on the desired document types in area 90 and saving the new view to the database.

Returning to FIG. 6, an icon 92 presents a tool (not shown) by which the administrator may view and amend drop-down lists for the folder attributes, as described above with respect to FIG. 9.

As discussed with respect to FIG. 7, multiple users may be defined for each transaction party so that each user may have access to the party's documents. Through the administrator, the transaction party defines the access rights applicable to each party in a security profile. The transaction party may define multiple profiles so that when the party opens a new file, it may select a profile desired for that folder. Thus, a given user's access privileges may change from one folder to another. Additionally, the security profile defines the folder view that will be presented to each user when that user opens any folder to which the profile is assigned. Accordingly, depending on the security profile, different users may have different views of the same folder.

Returning to FIG. 6, activation of an icon 94 next to a given transaction party's name presents a screen (not shown) listing each of the security profiles defined for that party. If the administrator clicks on one of the listed profiles, the system presents a screen shown in FIG. 11 that illustrates the access rights for the selected profile. As used herein, a security "role" refers to a group of users having the same set of access rights within a given security profile. The profile shown in FIG. 11, for example, includes four roles. For each role, the administrator may grant access rights by clicking one or more desired boxes in the "Access Rights" column to place a check in the box or may delete access rights by clicking on an existing check mark to thereby remove the mark. A "view" right provides the ability to view the folder and the documents contained by it, subject to document security profiles discussed below. A user may also be granted the right to delete the folder. This deletes the folder definition in the database but does not delete documents in the repository. The "add documents" right permits the user to add documents to the repository for the folder to which the security profile applies. The "remove documents" right permits the user to remove documents from a folder. As discussed above, however, this does not provide the user with the ability to delete documents from the repository. A document cannot be removed from the repository by any party. In the presently-described embodiment, the system automatically deletes a document when it is no longer associated with any folder. Alternatively, a document might remain in the repository for some additional time period after the last reference to it has been deleted.

The "edit property" right permits the user to edit properties for a folder that are defined as editable. The "edit security" right gives the user the ability to edit the folder security profile.

If any users defined in the list shown in FIG. 7 for the transaction party are not currently assigned to a security role, such users are listed under the "user" column of a box 96 to the right of the security profile view. In the right-hand column of box 96 adjacent each user name is a list of all roles currently defined for the profile. To add the user to a given role, the administrator clicks on the desired role in the right-hand column of box 96 adjacent to desired user's name. The system then inserts the user in the appropriate row in box 98. To remove a user from a security role, the user clicks on the user name in the role. The system deletes the user from the role, and the user's name is returned to box 96.

In addition to the users defined for the transaction party as shown in FIG. 7, box 96 also includes a "CREATOR" user. As indicated above, one of the folder attributes is the user that creates the folder. This user name is linked to the "CREATOR" user name in box 96. A user is granted any permission that is either explicitly granted them through the addition of their user name to role, or any permission that is granted the creator of a folder if that folder was created by the user. This may be useful where it is desired to provide certain access rights to the CREATOR where the administrator does not know the CREATOR's identity.

To remove a role from the profile, the administrator clicks on an "X" icon in the left hand column of box 98 by the desired role. When a role is deleted, all users in the role are returned to box 96. To insert a new role, the administrator activates the "add new role" button at the bottom of the screen, at which the system adds a new role to box 98. The administrator then enters a description for the role in the "description" column, defines access rights and adds users as described above.

As shown in FIG. 10, a folder view is also assigned to each role. The administrator defines, and may change, the folder view for each role. The view must be one of the views defined for the party as described above with respect to FIG. 10. Accordingly, the system presents document images to a user according to the view defined for that user by the security profile assigned to the folder accessed by the user. Again, this means that a user may see different views in different folders and that different users may see different views in the same folder.

The "save changes" button permits the administrator to save an edited security profile to the database. Prior to saving the changes, the administrator may remove edits by activating the "reset" button.

The administrator may also create a new security profile from the profile list screen (not shown) described above. The screen includes a "name" field. The user enters a name for the profile and activates a "create" button, thereby causing the system to present a screen similar to the screen shown in FIG. 11. In the new screen, however, no roles are defined, and all users are listed in box 96. The administrator define roles for the new profile through the "add new role" button as described above.

Security profiles are also defined for documents. Through the administrator, a transaction party may define a security profile that is stored in the database in association with that party. When one of the party's users thereafter adds a document to the repository in association with one of the party's folders, the system activates a pointer to the document security profile. Accordingly, when a user thereafter accesses one of the party's folders and then accesses one of the document images associated with the folder, the user's access rights to the document are defined by both the folder security profile and the document security profile. Presently, the system defines a single document security profile for each folder that is initially assigned to documents added to that folder. Thus, all documents in the folder are initially subject to the same profile. It should be understood, however, that multiple document profiles may also be defined.

The security profile list screen (not shown) described above lists each document security profile (if more than one) defined for the selected party. Selection of one of the listed document security profiles presents a screen similar to the folder security profile screen shown in FIG. 11, except that the document security profile defines different access rights and does not define folder views. More specifically, the document security profile defines rights to remove documents, view documents, edit document properties and edit the document security profile. As in folder security profiles, document removal refers to the ability to eliminate access to the document from the folder in which the user is operating at the time. In order to remove a document from a folder, the user must have document removal privileges in both the folder and document security profiles. If the user is denied such rights in either the folder security profile or document security profile, the user is unable to remove the document from the folder. Similarly, the user must be granted view access rights in both security profiles in order to view a document image. The administrator may add and edit document security profiles similarly to adding and editing folder security profiles as discussed above.

Referring again to FIG. 3, when a transaction party user accesses host system 40 from its work station 52 through Internet 46, client interface process 62 (FIG. 4) requests the user's user name and password. Each user name must be unique. In one embodiment, the user name is the user's name as indicated in FIG. 7 in combination with the name of the transaction party with which the user is associated. Passwords are assigned as described above. If the user provides a valid user name and password, the user interacts with the client interface to manage document image views and folders through various web pages as described herein.

Figure 13:
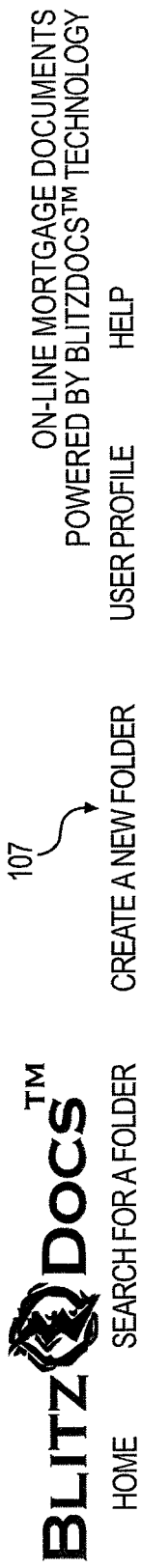
FIG. 13 is an exemplary user screen display for use in an embodiment of the present invention.

The client interface first presents the transaction party user with a folder search screen, as shown in FIG. 12, that lists each folder attribute (FIG. 9) applicable for searching that transaction party's folders. The screen provides a field for each attribute, and the user may provide entries to one or more fields as desired. To automatically enter the present date in the "Date Created" field, or to automatically enter the user's name in the "Created By" field, the user activates buttons provided to the right of those fields. Activation of the "search" button at the bottom of FIG. 12 presents a screen shown in FIG. 13 listing each of the folders meeting the attribute limitation entered by the user at FIG. 12. In the illustrated example, the search criteria were for all folders in which the mortgage applicant state was Georgia. Responsively to the request, the client interface creates and executes a query against database 48 (FIG. 3) and presents the screen shown in FIG. 13 to the user at its work station. The column titles in FIG. 13 represent the folder attributes defined for search results for the transaction party to which the user is associated. The user may sort the search results using the attributes by clicking on the desired column heading.

The present discussion assumes that the user has been granted access in the security profiles to view the folder and documents and to take other actions as described herein. In the event, however, that the user attempts to take an action for which the user does not have sufficient access rights, the host client interface notifies the user that there is insufficient authority and does not execute the requested action.

Figure 14:
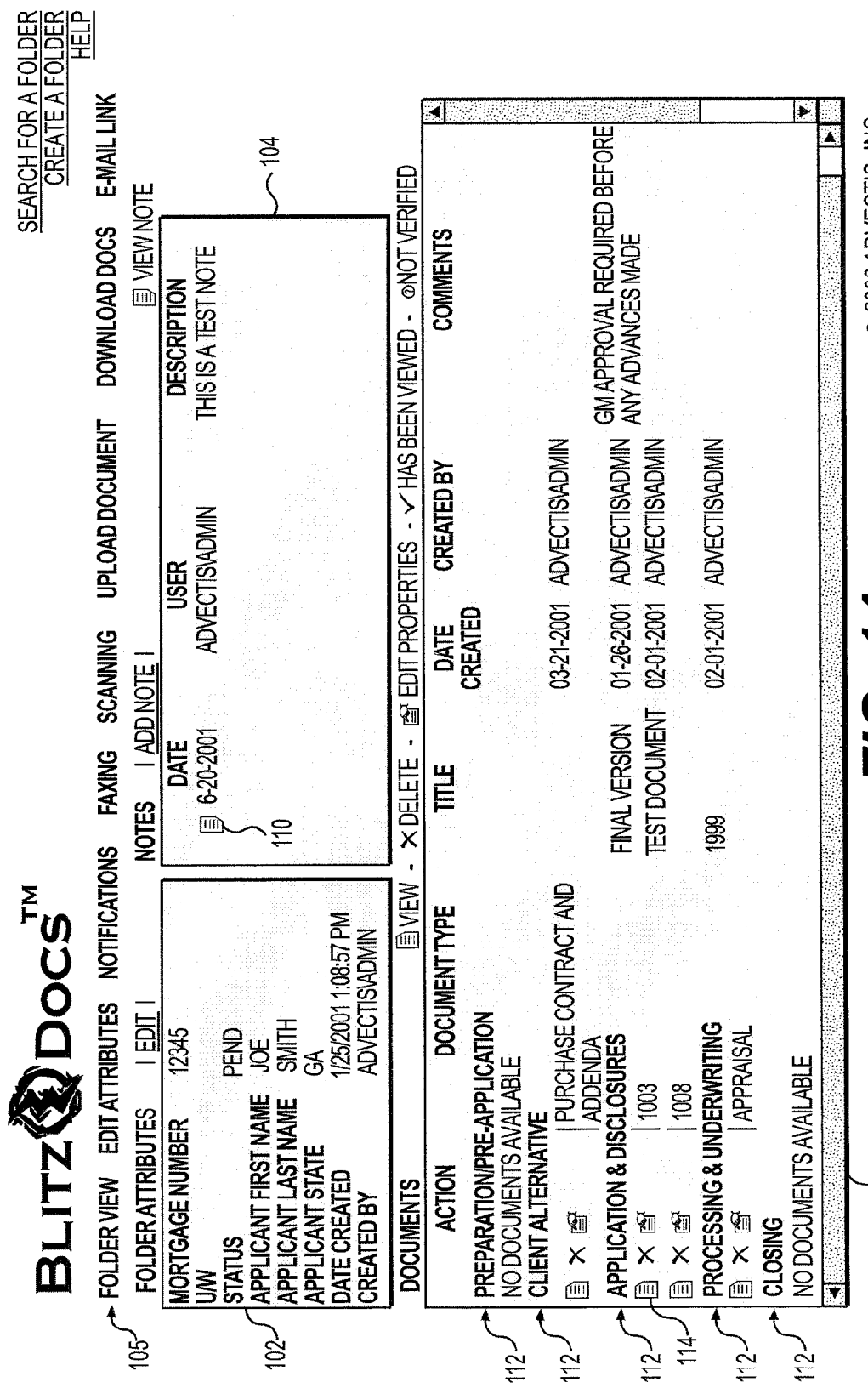
FIG. 14 is an exemplary user screen display for use in an embodiment of the present invention.
Figure 15:
FIG. 15 is an exemplary user screen display for use in an embodiment of the present invention.

"Open Folder," "Edit Properties," "Fax Coversheets" and "Scan Coversheets" icons provided to the left of each folder shown in FIG. 13 permit the user to access the folder, edit its properties and obtain fax or scan coversheets by which the user may add additional documents to the folder. Activation of the "Open Folder" icon 100 for a given folder produces a folder view screen as shown in FIG. 14. The folder view screen includes a folder attributes box 102, a notes box 104 and a document list box 106. Folder attributes box 102 displays the attributes established for the selected folder. If the user has sufficient authority, the user may change the folder attributes by activation of an "edit" button at the top of box 106 through a screen shown at FIG. 15. An "edit attribute" tab on a tool bar 105 shown in FIG. 14 also directs the user to the folder property screen shown in FIG. 15. This screen lists each attribute and, except for the creation date and creator fields, provides an edit box through which the user may change the attribute information. The system automatically fills the "Date Created" and "Created By" fields when the user initially creates the folder. The folder property screen also permits the user to define the folder security profile that is to be applied to the folder. A pull-down list 108 includes the name of each folder security profile defined for the transacting party to which the user is associated, as described above with respect to FIG. 11. The "update" button saves the changed folder properties in the database, and a "reset" button removes any unwanted and unsaved edits from the current screen. To return to the folder view screen shown in FIG. 14, the user closes the window in which the folder properties screen is displayed.

Notes box 104 permits the user to add comments relating to the folder. The box provides the date the note was entered, the user that entered the note, and a description heading. Activation of a view icon 110 opens a window that displays the text of the note. To add a new note, the user activates an "add note" icon at the top of box 104, thereby opening a window displaying a screen (not shown) having entry fields in which the user may enter a note description and note text.

Document list box 106 displays each document image stored in the repository that is associated with the selected folder. For each document, box 106 displays the document title, the document type, the date the document was created, the party creating the document and any comments attached to the document. The documents are grouped according to group headings 112. Documents are linked to document groups by their document types. As described with respect to FIGS. 10 and 11, document types are associated with document groups in a folder view which is assigned to the user in the selected folder by the folder security profile. Box 106 is the presentation of documents to the user as defined by the document view.

If the user has view access to a document, the user may view the document through a view icon 114. In response to activation of this icon, the client interface creates and executes appropriate queries against database 48 (FIG. 3) and opens a window for the user in which is displayed the document image in PDF format. The screen (not shown) includes a "properties" button that produces a document properties screen shown in FIG. 16. Through this screen, the user may change the document's type or title and may provide comments for display in document list box 106.

Returning to FIG. 14, a delete icon is provided at each document line by which the user may remove the document from the selected folder. As described above, this requires that both the folder and document security profiles provide removal rights to the user.

An "edit properties" icon 101 on each document line directs the user directly to the document properties screen shown in FIG. 16. Once the user has reviewed a selected document, the user may activate a "mark as viewed" button in the document property screen, or in the document view screen (not shown), thereby activating a "has been viewed" icon at the document line in box 106.

As described in further detail below, documents submitted by a fax transmission are not executed through a user login event. Accordingly, the indexing process initially marks each faxed document as being non-verified, and a "not verified" icon is displayed at the document line in box 106 for any such document. In this case, the document property screen (FIG. 16) for such a document displays "No" in the "Has Been Verified" line, along with a "mark as verified" button (not shown). Activation of the button by the user removes the "not verified" icon from document list box 106.

Figure 17:
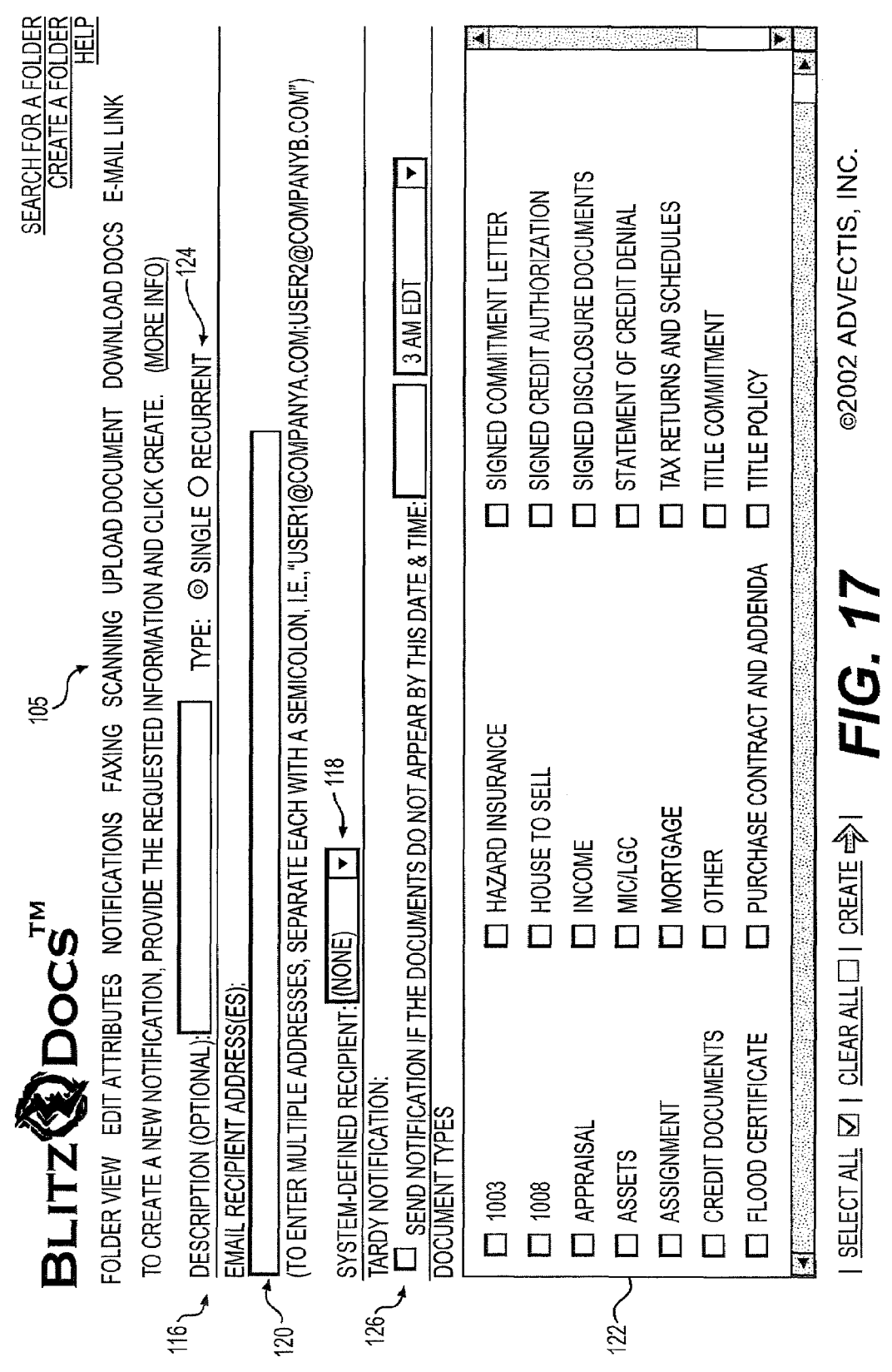

Within a folder, a user may instruct the client interface to send an email to the user's email address, or to other selected addresses, when the folder receives documents of a predefined type. To set such notifications in a folder, the user activates a "notifications" tab on toolbar 105. In response, the client interface presents a notifications screen as shown in FIG. 17. The notification screen includes a description line 116 in which the user may enter text to be included in the email message. In a pull-down list 118, the user may select any of the email addresses for users associated with the same transaction party, and/or the user may enter other email addresses at line 120. The user may select one or more document types that will trigger a notification in a box 122.

Thereafter, the client interface sends an email to each email address selected or entered at lines 118 and/or 120 whenever a document of a type selected in box 122 is added to the folder. If the user designates the notification as a "single type" at line 124, the client interface sends an email to the listed email addresses only when documents under all document types selected in box 122 have been added to the folder. This type of notification will only occur once, after the last of the required document types is added to the folder. If the user selects the "recurrent" type, the client interface sends emails to the selected addresses any time a document under any of the selected document types is added to the folder.

If the user selects a "Tardy Notification" box at line 124, and specifies a date and time, the client interface will also send an email to the defined email addresses if documents under all document types selected in box 122 have not been added to the folder by the date and time specified in line 126. In the present embodiment, the client interface sends tardy notifications only if the "single" type is selected at 124.

Figure 18:
FIG. 18 is an exemplary user screen display for use in an embodiment of the present invention.

From toolbar 105, activation of a "faxing" tab causes the client interface to respond with a fax coversheet screen as shown in FIG. 18. A box 128 lists each document type defined for the folder. If the user selects one or more document type and executes a "submit" button at the bottom of the screen, the client interface generates a fax coversheet, such as shown in FIG. 19, for each document type. Each fax coversheet contains one or more barcodes that provide the information required to categorize and place the document in the repository, which at a minimum includes the document type and destination folder identifier.

Referring also to FIGS. 3 and 4, the user places the appropriate fax coversheet (i.e. by document type) in front of each document the user wishes to submit to the repository for the folder. Each document may be one or more pages in length. The user then sends the fax coversheet and document through the user's fax machine 56 by a dial-up connection to host fax server 59. The fax number for server 59 may be printed on the fax coversheet. In the presently preferred embodiment, all coversheet barcodes are defined by "3 of 9" (or code 39) barcoding.

Fax server code 66 receives the fax image and downloads the resulting TIF file directly to indexing process 64. Indexing process 64 scans the TIF image for the barcodes, extracting indexing information from the available barcodes. Using the barcode data, the indexing process separates the TIF image into one or more documents, which it then converts to PDF files, and stores the image in database 48 in association with the document type, folder ID and any other associated data extracted from the fax coversheet.

Referring again to the fax coversheet request screen in FIG. 18, activation of a "file completed notification" selection box in a box 132 causes the client interface to generate a fax coversheet that allows the user to trigger an email to a designated email recipient for the folder. In initially setting up a transaction party, the administrator may define an email address provided by the transaction party to which "File Completed Notification" emails are to be sent. This may be useful, for example, when a user preparing documents for a file completes the documentation for a file and wishes to notify the transaction party's email recipient that the file is complete. To do this, the user selects the "File Completed Notification" box and executes the "submit" button at the bottom of the screen in FIG. 18. In response, the client interface generates a fax coversheet similar to the coversheet shown in FIG. 19. The coversheet contains barcodes that indicate the related folder ID and the notification action to be taken. The user then faxes the coversheet alone to fax server 59 (FIGS. 3 and 4). Upon receiving the resulting TIF file from the fax server code, the indexing process reads the barcode data and causes the primary server software to send an email through the Internet 46 to the email recipient address associated with the party that created the folder specified by the folder ID indicated in the barcodes.

A user may also scan documents to create document images for storage in the repository. Referring again to FIG. 14, activation of a "scanning" tab on toolbar 105 causes the client interface to generate a scanning batch coversheet such as shown in FIG. 20, which contains one or more barcodes that indicate the ID of the associated folder.

The scanning batch coversheet may be used to cover multiple documents of different document types. Each document has its own scanning coversheet, referred to herein as a "document separator coversheet." To generate a separator coversheet in the mortgage example discussed herein, the user activates a "Mortgage Documents" button 138 in the scanning batch coversheet shown in FIG. 20. In response, the client interface generates a scanning coversheet document type screen as show in FIG. 21. Similarly to the fax coversheet selection page, the user may select one or more document types from a list of document types defined for the folder provided in a box 140. Activation of a "submit" button causes the client interface to generate a document separator coversheet, as shown in FIG. 22, for each selected document type. Each coversheet contains one or more barcodes 144 that indicate the associated document type.

Returning to FIG. 20, activation of a "File Completed Notification" button in the scanning batch coversheet screen causes the client interface to generate a "File Completed Notification" coversheet, which functions in the same way as previously described for faxing. The user may fax this coversheet to the host fax server or may include the sheet in a scan.

Returning to the scanning coversheets shown in FIGS. 20 and 22, and referring also to FIGS. 3 and 4, the user places an appropriate (i.e. according to document type) document separator coversheet over each document it wishes to scan. The user then feeds the scanning batch coversheet, followed by each document/coversheet combination, into the user's scanner 58. A scan program module at user workstation 52 interfaces scanner 58 and the user's workstation 52. The scan program code controls scanner 58 and reviews each scanned page for bar codes.

The user activates the scan program module, written in a combination of VISUAL BASIC and C++, at its workstation 52 prior to scanning documents. Upon activation, the scan program connects to the host Web Server through the user's Web browser and requests the user and folder properties from the host system. The host system first requires a user login, and the scan program therefore prompts the user for its user name and password for the host client interface. If the user successfully enters this information, the scan program retrieves any required configuration information, such as folder properties, stored by the host system and used by the scan program module.

The scan program code permits the user to scan images without a scanning coversheet. To do so, the user selects the "file" pull-down list from a main scan program page (FIG. 23) presented by the scan program at workstation 52 and selects a "Select Destination Folder" from the resulting pull-down menu. This causes the scan program code to produce a folder search screen at the user's workstation, as shown in FIG. 24. Upon filling in desired search criteria and activating a "search" button on the screen, the scan program code connects to the client interface at the host system and provides the search criteria to the client interface. The client interface executes appropriate queries against database 48 and returns a list of folders that meet the search criteria for the transaction party with which the user is associated, as shown in FIG. 25.

Figure 23:
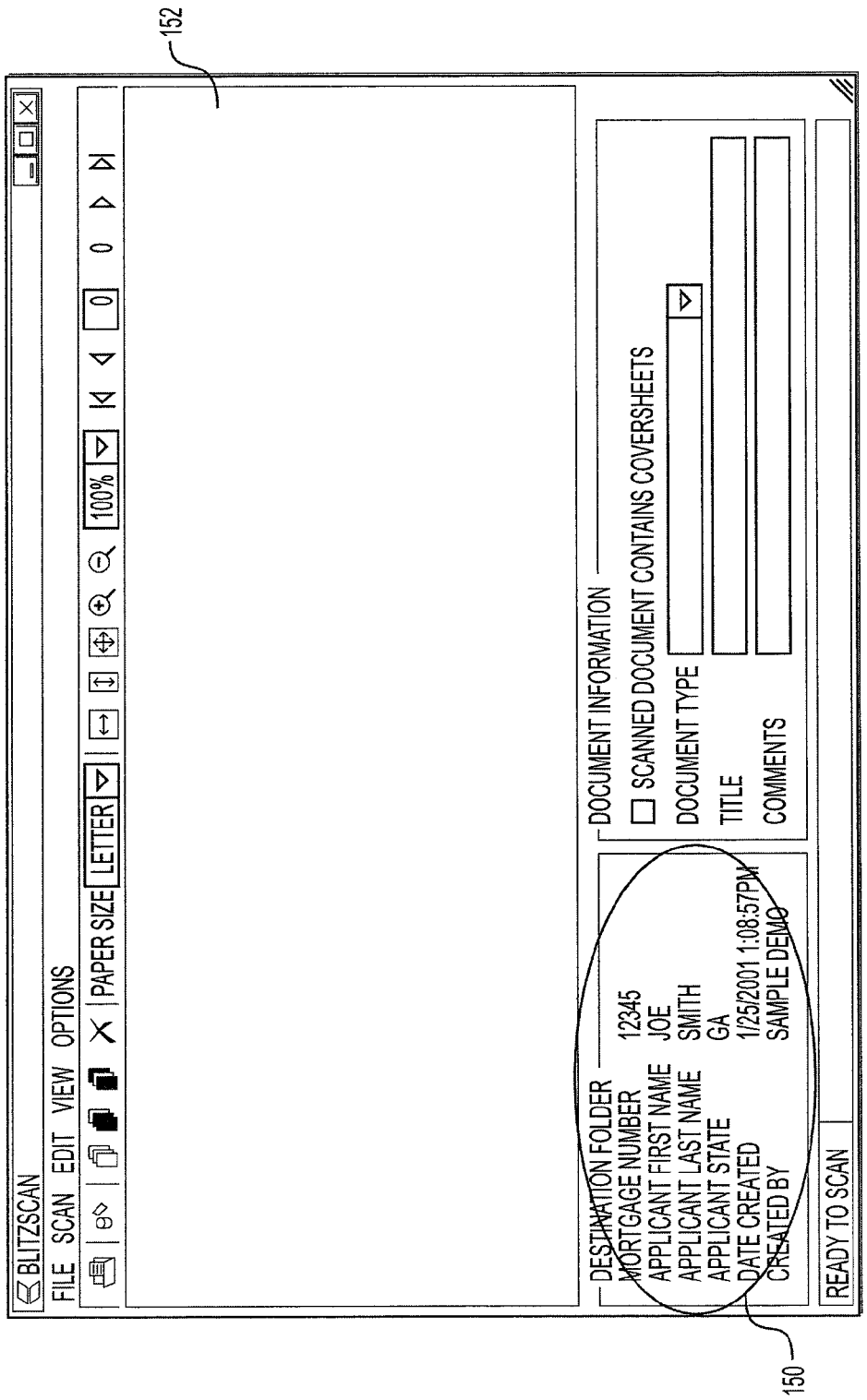
FIG. 23 is an exemplary screen display for use in an embodiment of the present invention.

Selection of one of the folders from the screen loads the folder attribute information in a "Destination Folder" box 150 in the main scan program screen shown in FIG. 23. The user then enters the document type from a pull-down box that lists all document types for the document type identified in box 150. The user may also define a document title and insert comments. Activation of the "scan" button at the top of the screen drops a pull-down list from which the user activates the user's scanner 58 (FIGS. 3 and 4). The user then feeds the desired document into the scanner, and the scan program stores the resulting TIF file in association with the folder ID from box 150, the document type entered by the user, the user's User ID, the date and time of scanning, and the document title and comments, if any, entered by the user. At the end of the scan, the scanned document is displayed in a window 152. This procedure may be repeated within the same destination folder. For each document, the user selects a document type, optionally enters a title and comments, and executes the "scan" button in the scanning screen. The scan program accumulates scanned document images under the destination folder ID.

A "new document" option in the "scan" pull-down list allows the user to identify another document type, title and comments and execute a subsequent scan. Thus, the user may add documents of different types to the scan file for the destination folder. An "append page" option under the "scan" pull-down allows the user to scan a page for addition to the end of an existing scan. An "insert page" option allows the user to scan one or more new pages and add the new pages before the page currently viewed in box 152. A "delete page" option allows the user to delete a page currently viewed in box 152.

Having searched for and selected a destination folder for scanned documents, so that the system displays the selected destination folder in box 150, the user may elect to use document separator coversheets in association with each document, rather than entering the document type from the pull-down list shown in FIG. 23. In this case, the user selects the box shown in FIG. 23 indicating that the scanned documents contain coversheets. If the user has selected a destination folder, a batch coversheet is unnecessary, and the scan program expects only document separator coversheets. If the user has not selected a destination folder, so that box 150 is empty, the scan program looks both for a batch coversheet and document separator coversheets. In either case, the user may enter a title and comments for each document.

If the user selects the coversheet option, scanning proceeds in the same manner. Assuming both batch and document separator coversheets are used, the user selects the "scan" pull-down list and selects the scan execution option. The program receives and stores the scanned image in association with an identifier indicating that the image is expected to contain batch and separator coversheet barcodes. At the end of the scan, the scanned program presents a screen (not shown) prompting the user whether the user wishes to scan additional pages to the existing file, to store the image, or to review the image. If the user elects to store the image, the TIF image is stored in association with the coversheet identifier, and the user may execute additional scans from the "scan" pull-down list at the main scan screen. For each subsequent scan to the same scan file, the scan program would expect only a document separator coversheet, not a batch coversheet.

If the user selects the coversheet option and defines a destination folder in box 150, the scan program stores the resulting TIF images in association with the folder ID and an identifier indicating that document separator barcodes, but not batch barcodes, are present in the images.

To upload a scanned file at the end of a scan procedure, the user selects the "file" pull-down list in the screen shown in FIG. 23 and selects a "Submit Current Document" option. The scan program contacts the host system Web server through the user workstation Web browser and the Internet and uploads the TIF images in the scan file, along with the folder ID, the User ID, and the document type for each document contained in the TIF image. The host browser hands the received scan file to the indexing process, which translate the TIF images into PDF format and stores the images in the host system database with the associated information.

In addition to the fax and scan options, the user may upload a previously-stored electronic image to the repository at the host system. Referring again to FIG. 14, activation of an "upload document" tab at toolbar 105 causes the client interface to present the user with an upload screen as shown in FIG. 26. The screen includes a pull-down list populated by the document types defined for the folder. The user may define a title and comments to associate with the image document.

The screen includes an entry line for the file directory address at which the image file is located. A "browse" button 154 opens a WINDOWS EXPLORER window at the client workstation through which the user may find the desired document image file stored on the user's local or network drives. Upon selection of the desired image file in the window, code located at the client workstation inserts the appropriate file address in the address line. Activation of an "upload" button as shown in FIG. 26 causes the client-side code to contact the host system Web server and upload the desired image file, along with the selected document type, title, comments, folder ID, User ID, and document type.

The upload screen in FIG. 26 includes a box by which the user may indicate whether the image file contains barcode coversheets. This may be true, for example, if the stored document image was faxed or scanned with barcode coversheets as described above. Because the coversheets are assumed to contain document types, activation of this box eliminates the document type field from the screen. Since the barcodes do not necessarily include a folder ID, the folder ID field remains. If the image barcode contains a folder ID, the barcode folder ID controls.

If the upload file contains barcodes, the indexing process reads the barcodes to determine the folder ID, User ID, and document type. If the upload file contains no barcodes, this information is provided in data associated with the image files. The indexing process detects the image file format and, if possible, translates the image into PDF format. The program then stores the images in association with the folder, User ID, document type and, if provided, title and comments.

Referring again to FIG. 14, an "email link" tab on toolbar 105 causes the client-side to generate from the user's web browser an e-mail enclosing a link to the page from which the "e-mail link" tab was activated. The user enters a desired e-mail address in the e-mail and sends the email to the desired party. Upon opening the e-mail, the receiving party may enter the linked page by activating the e-mail link. Before presenting the receiving party with the web page, however, the host system prompts the receiving party for a user name and password for the applicable folder. A user may execute the e-mail link option, for example, while reviewing a document in order to share the document with another user defined under the folder.

Figure 27:
FIG. 27 is an exemplary screen display for use in an embodiment of the present invention.

To increase reviewing speed, the user may wish to download electronic copies of document images to its local drive, rather than review each image over an Internet connection. To do this, and again referring to FIG. 14, the user activates a "download docs" tab on toolbar 105. In response, the client interface provides a folder download screen as shown in FIG. 27. The screen lists each image document stored in the repository for the folder, again grouped by document group and document type as defined by the folder's security profile. Using check boxes at the left of the document image lines, the user may select those document images it wishes to download.

The html supporting the page shown in FIG. 27 includes embedded code (an ActiveX component, compiled from VISUAL BASIC code) that establishes a communication with the host web server through the user's workstation Web server and the Internet and that downloads the requested document images from the host database to temporary storage at the user's workstation. After selecting the desired document images and executing a "download" button at the bottom of the screen shown in FIG. 27, the selected documents are downloaded and stored on the user's workstation.

Upon completion of the file download, the client interface returns the user to the folder view screen shown in FIG. 14. Thereafter, when the user accesses a view of the document through the folder view screen, the document image is retrieved from the user's local temporary storage. When the user ends its document management session, the embedded code deletes the downloaded document images from the user's storage. Alternatively, it should be understood that the system may leave the downloaded image files in the user's memory.

Figure 28:
FIG. 28 is an exemplary screen display for use in an embodiment of the present invention.

Returning to the folder search results screen shown in FIG. 13, the user may define a new folder by activating a "create a new folder" tab at a toolbar 107. This causes the client interface to present a folder creation screen as shown in FIG. 28. The upper part of this screen is similar to the folder attributes edit screen shown in FIG. 12, except that the creation date and creator fields are omitted because the system automatically populates these fields upon creation of the new folder. Otherwise, the user may populate the folder attribute fields as desired. The "status" pull-down list in the present mortgage example allows the user to select a designation indicating that the mortgage to which the folder corresponds has been approved, declined, is pending, or is in underwriting.

At the bottom of the folder creation screen, a pull-down box under "Folder Configuration" allows the user to select one of the folder security profiles defined for the particular folder. As described above, this defines the folder security profile that will be applied to the folder, the document type list that will be used by the folder, and the document security profile that will be initially applied to documents that are subsequently added to the new folder. Provided all required information is entered in the folder creation screen, activation of the "create" button at the bottom of the screen saves the folder to the system database.

Activation of a "User Profile" tab on toolbar 107 causes the client interface to generate a user profile screen as shown in FIG. 29. The screen automatically displays the user's username and User ID, which the user may not edit. Provided the user has sufficient authority, however, the user may change its first and last name, e-mail address and password.

As indicated above, two different parties may share documents with each other. That is, the parties may establish a relationship in the system whereby one party gains access to documents in the repository to which the other party has access and/or may have access in the future. When one transaction party (hereafter the "sharing" party) desires to share documents from one of its folders with another transaction party (hereafter the "receiving" party), a user from the sharing party selects a folder and activates a link (not shown) from the resulting folder view page (FIG. 14) that presents the user with a list of other transaction parties from which the user may select the receiving party. Once the user selects the receiving party, the system presents a screen from which the user may select a receiving party user to whom the system will notify that a share has been initiated. As part of a party's set-up in the system, the party identifies one of its users as a default recipient for such notifications and may identify other users that may substitute for the default. If such alternates are provided, the sharing party user may select one from the screen.

While the present embodiment is described in terms of a sharing party defining a share (as used herein, the term "share" refers to the establishment of a relationship by which one party grants document access to another party) for one receiving party at a time, it should be understood that the system may be configured so that the sharing user may select multiple receiving parties from the receiving party selection screen. In that event, the user will select a notification recipient for each receiving party, and the system database stores multiple shares—one for each receiving party.

After selecting the notification recipient, the sharing user may choose to share specific documents in its folder and/or to automatically share folder documents within one or more specified document types. The latter method is referred to herein as a "recurrent" share. In a screen similar to the download screen shown in FIG. 27, the system presents the user with a list of documents currently existing in its party's folder. To share specific documents, the user selects one or more documents by checking boxes beside the respective documents in the screen. The user may instead or additionally indicate that a recurrent share be established by checking a "recurrent share" box, in which case the system presents the user with a list of document types used by the applicable folder. Responsively to the parties, the administrator may have predefined in the system a global list of document types for a recurrent share. In such a case, the user may simply choose a global list to automatically define the document types. Alternatively, the user may define the document types for the recurrent share on a case-by-case basis. Here, the user selects one or more document types to be included in the recurrent share by checking boxes in the screen by the respective types.

Having identified the source folder, the receiving party and the documents and/or document types to be shared, the user executes the share by activating a "submit" button in either the document list or document type screens. The system then notifies the receiving party of the share, for example by sending an email to the specified receiving party user or presenting that user with a pop up notification screen when the receiving party user next logs into the system.

The receiving party is then responsible for accepting the share and for specifying the destination folder for the shared documents. Upon activation of a "share" tab, the system presents the receiving party user with a screen listing all shares that have been initiated to the receiving party. The user then selects a share it desires to accept by activating a check box by the desired share.

Shared documents are applied to an existing or new folder belonging to the receiving party. Accordingly, the system allows the receiving party to establish a map between the document types of the sharing party's folder to the document types of its folder. Where the receiving party sets up a new folder, the system also maps the attributes of the sharing party's folder to the new folder, thereby avoiding the need to manually enter attribute data. In a presently preferred embodiment, the system administrator defines attribute maps in the data hierarchy described below responsively to the parties.

When the receiving party user selects a share from the share list screen, the system presents a list of the receiving party's folders. If the user selects one of these folders, the system applies the shared documents to the selected folder. If the user selects a "new folder" icon in this screen, however, the system first presents a screen similar to the folder attributes screen shown in FIG. 15, in which the attribute fields are populated by the attributes in the sharing party's folder as defined by the attribute map. In the mortgage example, the map may automatically populate fields applicable to all parties, such as mortgage number, applicant information and date. The user may change any desired fields and may fill in any unmapped fields.

In order for the system to share a document from one folder to another, the document type map correlates the document type under which the document is assigned in the source folder to a document type to which the document should be applied in the destination folder. Although the parties involved in each sharing transaction may provide this information as needed, the system may also store default mappings (which are predefined by the administrator responsively to the parties) by which the system facilitates future sharing transactions between the same parties.

When the receiving party user selects an existing or new folder to which to apply the shared documents, the system first presents a screen listing any specifically shared documents. The screen shows the source folder's document types on one side and the receiving folder's document types on the other. On the source side, the screen lists each shared document under its associated document type. On the receiver side, the system lists the shared documents under the receiving document types according to the default map. The receiving party user may, however, change the mapping. To move a document from one document type in the receiving folder to another, the user clicks on a box beside the desired document, thereby presenting a drop-down list of all document types in the receiving folder. Selecting a type in the list moves the document to the new type.

If no default mapping exists, the screen's receiver side lists the shared documents without association to document types. The user then activates a box beside each document and selects a desired document type.

To accept the document mapping, the user activates an "accept" button on the document share screen. If the user activates this button when there is also a recurrent share, or if there is only a recurrent share when the user selects a receiving folder, the system presents a screen that presents a document type mapping between the source (sharing) folder and the receiving folder. The screen lists the sharing folder's document types on one side and the receiving folder's document types on the other side. The sharing types are grouped beside the receiving types to which they apply, and multiple sharing types may map to the same receiving type. The user may change the type. To move a sharing type from one receiving type to another, the user clicks on a box beside the desired sharing type, thereby presenting a drop-down list of all document types in the receiving folder. Selecting a type in the list moves the sharing type to the new receiving type. Upon activating an "accept" button on this screen, the system saves the new map.

Once the receiving party accepts the share, the system applies any specifically shared documents to the receiving party's folder. If there is a recurrent share, the system applies to the receiving party's folder any documents of the selected type(s) that then exist in the sharing party's folder or that are thereafter added to the sharing party's folder. More specifically, the system thereafter monitors the sharing party's folder for the addition of documents of a type corresponding to one of the types associated with the recurrent share and automatically shares any such documents to the receiving party's folder.

The sharing party may terminate or disable a share at any point, but any documents already shared to the receiving party's folder remain available to the receiving party.

C. Data Hierarchy

Figure 30A:
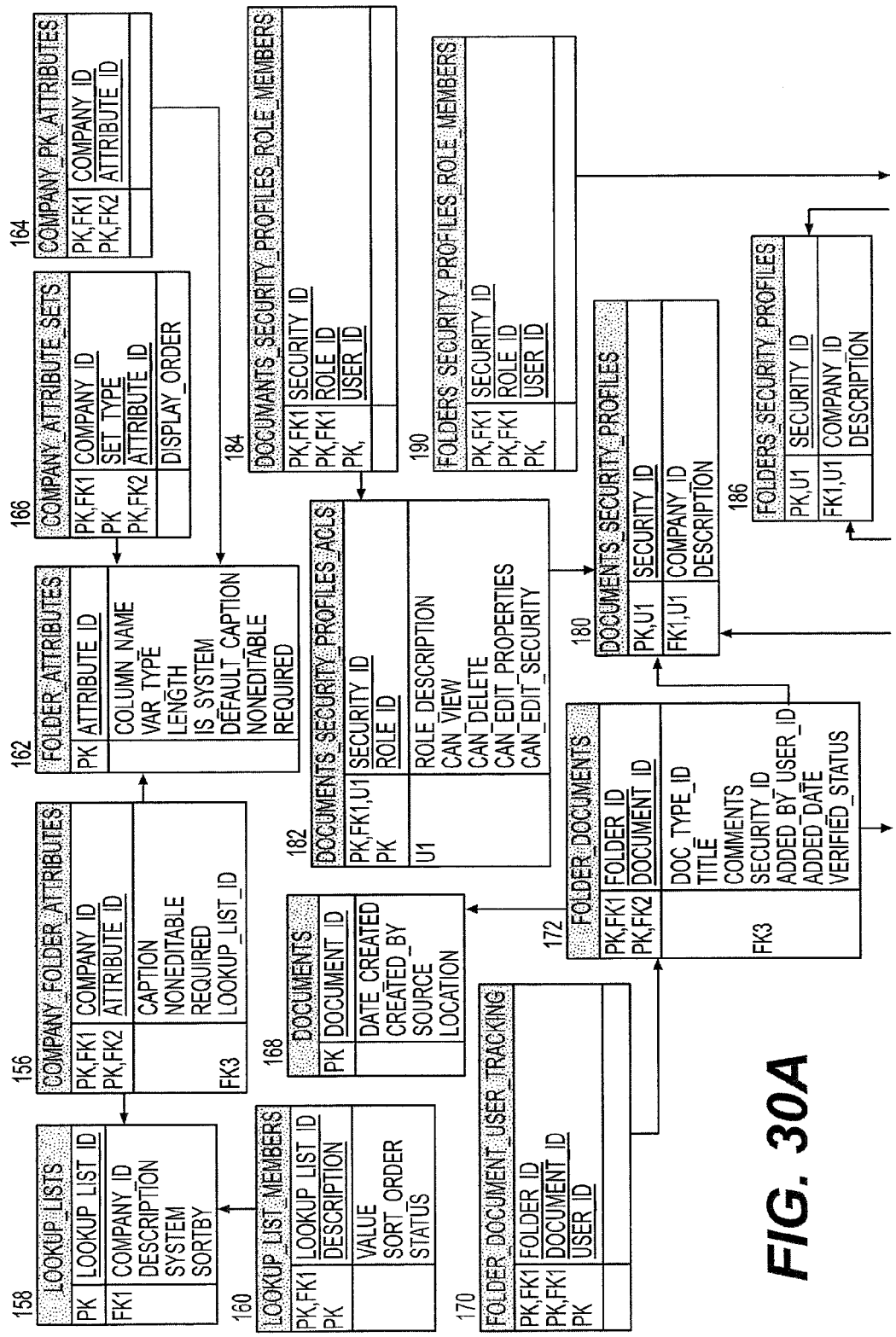
FIG. 30 is a diagram of an exemplary data hierarchy for use in an embodiment of the present invention.
Figure 30B:
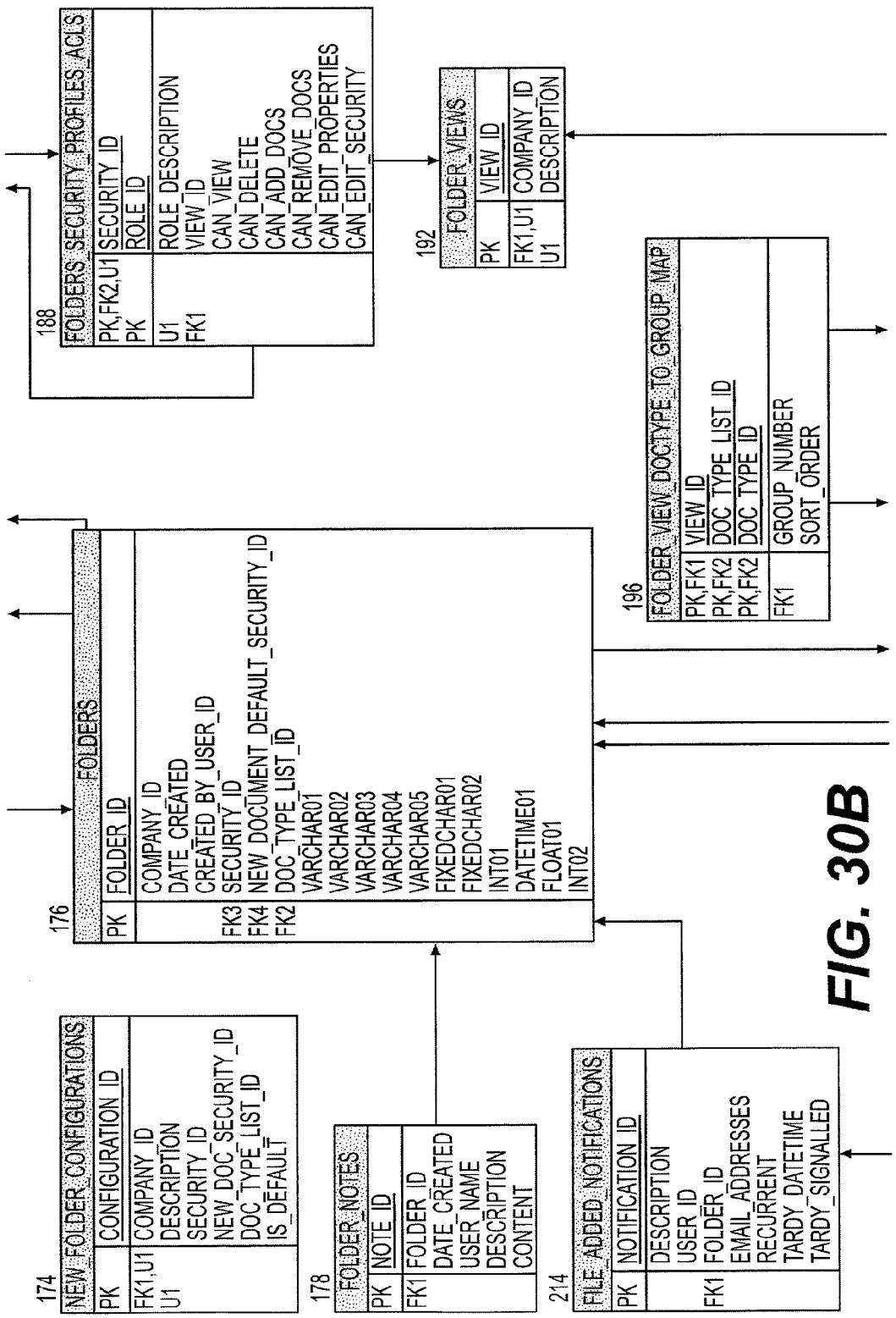
Figure 30C:
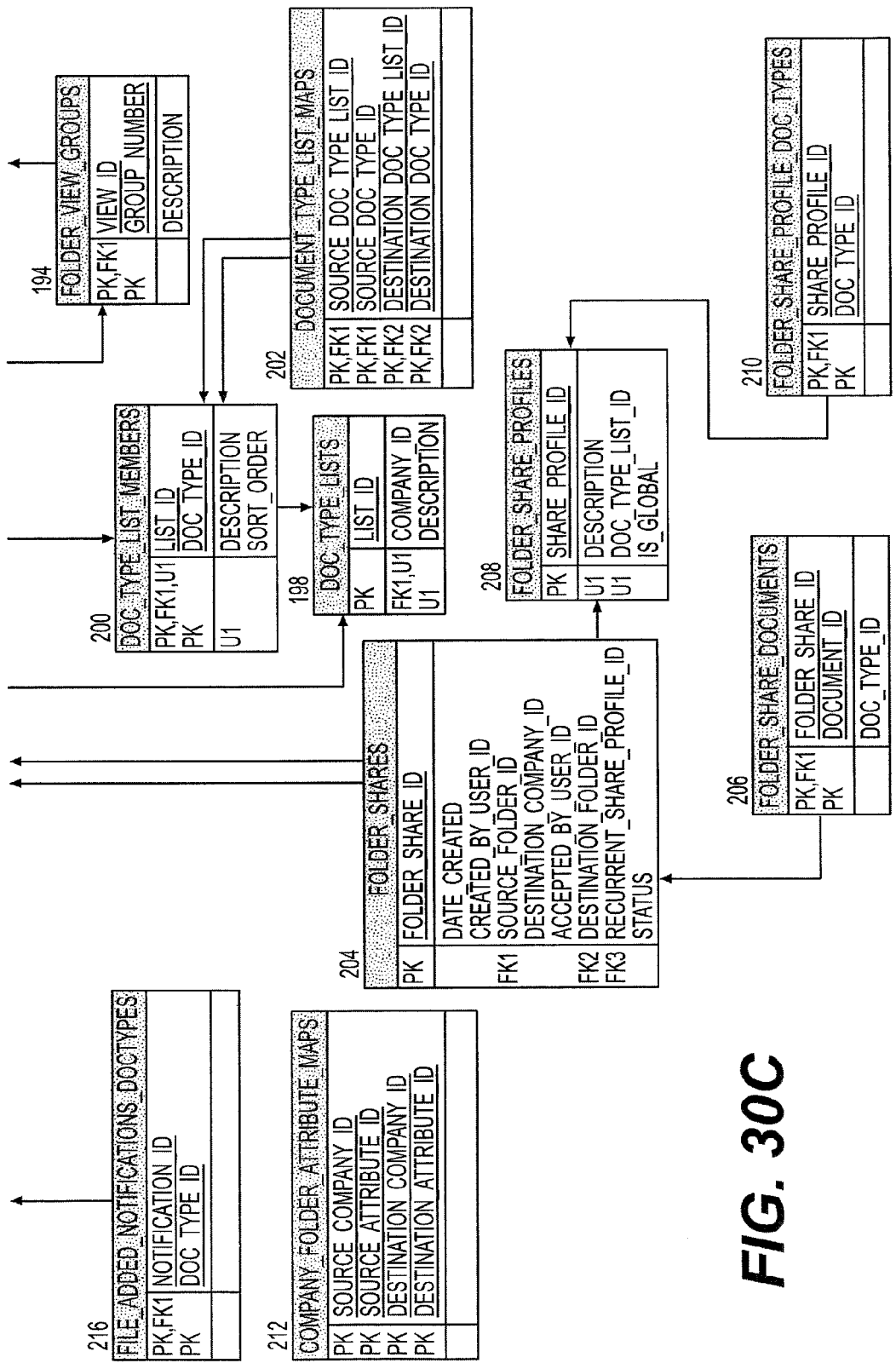

FIG. 30 describes a data hierarchy for folder, document and system configuration information and relationships stored at the host system database. Within FIG. 30, the following conventions are used to describe table columns and relationships. A line drawn between two tables indicates a foreign key relationship, with an arrow indicating the parent table. For example, the line drawn between tables 158 and 160, with the arrow pointing to table 158, indicates that a primary key-foreign key relationship exists between the two tables, that table 158 is the parent table of this relationship, and that table 160 is the child. Each table column may denote additional properties. The letters "PK" next to a column indicate that the column is part of the primary key for that table. The letters "FK" next to a column indicate that it is the child of a primary key-foreign key relationship. The letter "U" next to a column indicates that it is part of a unique key constraint. The FK and UK symbols also contain a number qualifier, such as "FK1" and "FK2," which discern between multiple keys of the same type within the same table.

It should also be noted that description of the database tables uses the term "company" to identify a transaction party. As such, each transaction party is assigned a unique company ID in the system, which is subsequently used to identify the data associated with that party.

Referring to table 162, FOLDER_ATTRIBUTES, each of the available folder attributes defined by the system are assigned a unique ATTRIBUTE_ID. The information in this table describes the columns that are present in the FOLDERS table described below and that can be used by companies to define which attributes are used to define their folders. For each attribute entry in this table, the following information is provided. COLUMN_NAME indicates the name of the attribute's corresponding column in the FOLDERS table. DATA_TYPE indicates the column's data type (i.e., numeric or text). LENGTH indicates the maximum length of a value that can be stored for the attribute. IS_SYSTEM is a flag that indicates if the value of the attribute is maintained by the system. DEFAULT_CAPTION indicates the default caption that should be used when displaying the attribute to a user. NONEDITABLE indicates if the attribute is not editable. IS_REQUIRED indicates if the attribute requires a value.

Referring to table 156, COMPANY_FOLDER_ATTRIBUTES, the system administrator may associate to each company any of the non-system attributes enumerated in table 162 above. In this way, each company is provided some flexibility in how they wish to describe their folders. For each attribute, the company may also wish to override some of the system settings for a particular attribute. Specifically, using the CAPTION column, a company can override the default caption displayed for an attribute. Using the NONEDITABLE column, a company can also make an attribute otherwise designated as editable by the system non-editable for their folders. Likewise, using the REQUIRED column, a company can make an attribute otherwise not designated as required by the system required for their folders. Lastly, using the LOOKUP_LIST_ID column, a company may wish to associate an attribute with a lookup list of values, as described below, to control the available values a user can assign to that attribute.

As described previously, a company may establish a list of specific values that can be assigned to one or more folder attributes. Assigning a lookup list to an attribute facilitates easier data entry by the user and provides a way to control or limit the values entered. Each list of lookup values is first defined in table 158, LOOKUP_LISTS. Each list is assigned a unique identifier which is stored LOOKUP_LIST_ID. The COMPANY_ID column indicates the company that defined the list. DESCRIPTION provides a textual description of the list. SYSTEM indicates if the list is defined by the system and, therefore, available for use with any company's attributes. Non-system lists can only be applied to attributes defined by the same company that defined the list. Lastly, the SORTBY column indicates the preferred method used to the sort the list members as described below. The sorting method may specify that the members are sorted alphabetically using their descriptions, alphabetically by their values, or by a custom sort order specified for each member Referring to table 160, LOOKUP_LIST_MEMBERS, each lookup list will contain one or more members. For each member, the company must provide a description (DESCRIPTION) and may optionally provide a value (VALUE) that, if present, is used in place of description when storing a value for the attribute. If desired, the SORT_ORDER column may be used to define how the members of the lookup list are sorted when displayed to a user. The STATUS column indicates if the lookup list member should should be made available to the user when assigning attribute values. This STATUS option allows for a certain lookup list member to effectively be retired, meaning that it can not be used when assigning new values to a folder attribute but that it is still valid for folder attributes which had previously been assigned its value.

As described previously, each company can specify which attributes should be used to uniquely identify a folder, following the same concept as a primary key in a database. For each attribute that is designated as part of the unique key for a company's folder, an entry is made in table 164, COMPANY_PK_ATTRIBUTES.

Referring to table 166, COMPANY_ATTRIBUTE_SETS, each company can define subsets of its available attributes that can subsequently be used by Web pages to filter and or sort attributes specifically for certain functions. In the presently-described embodiment, the system defines three such subsets: attributes made available for search critera, attributes used to display search results, and attributes used to describe a folder in basic detail rather than full detail. For each attribute that is a member of an attribute subset, an entry is made in this table. The COMPANY_ID column indicates the company with which the corresponding attribute set is associated. The SET_TYPE column indicates the attribute set in which the attribute is a member. The ATTRIBUTE_ID column contains the identifier of the attribute being included in the set. The DISPLAY_ORDER column indicates the order in which the attribute will be sorted within the attribute set.

Referring to a table 176, each folder defined in the database is assigned a unique folder ID number which is stored in the FOLDER_ID column. The COMPANY_ID identifies the company that created the folder. The DATE_CREATED column indicates the date and time that the folder was created. The CREATED_BY_USER_ID column stores the identifier of the individual user that created the folder. The SECURITY_ID column indicates the folder security profile, as described below, that is to be applied to the folder. The NEW_DOCUMENT_DEFAULT_SECURITY_ID indicates the document security profile, as described below, that is to be initially applied to documents added to folder. The DOC_TYPE_LIST_ID column indicates the document type list, as described below, that is used to classify documents associated with the folder. The remaining columns are used to store values for the non-system folder attributes described above (table 156) that are made available to each company.

Referring to table 168, DOCUMENTS, each document added to the repository is associated with an entry in the database. Each document is assigned a unique DOCUMENT_ID by the system, which is stored in the DOCUMENT_ID column. The DATE_CREATED column indicates the date and time the document was added to the repository. The CREATED_BY column indicates the user that added the document to the repository. The SOURCE column indicates the mechanism by which the document was added to the repository, for example by fax, scan or upload. The LOCATION column is used to indicate where the document image is located, which is used to subsequently retrieve the document as necessary.

Referring to table 172, FOLDER_DOCUMENTS, each document may be associated with one or more folders. As such, for each document associated with a folder, an entry is made in this table. The FOLDER_ID column identifies the folder with which the document is associated. The DOCUMENT_ID column identifies the document being associated. The DOC_TYPE column identifies the document's classification within the folder, and must be a valid member of the document type list associated with the folder. The TITLE column optionally indicates a title for the document. The COMMENTS column optionally indicates comments for the document. The SECURITY_ID column indicates the document security profile that is to be applied to the document. The ADDED_BY_USER_ID column indicates the individual user that associated the document with the folder. The ADDED_DATE indicates the date and time at which the document was associated with the folder. The VERIFIED_STATUS indicates whether the document has not been verified, as described previously in the discussion of the folder view web page (FIG. 14).

Each user has the ability to track which documents it has viewed in each folder. Each time a user indicates to the system that it has viewed a document, an entry is made in table 170, USER_DOCUMENT_TRACKING. The FOLDER_ID column identifies the folder from which the viewed document was accessed. The DOCUMENT_ID column identifies the document that was viewed. The USER_ID column identifies the user that is indicating the document has been viewed.

Referring to table 174, NEW_FOLDER_CONFIGURATIONS, when a folder is created, the system applies certain default characteristics to the new folder. Each company can define one or more configurations from which a user can select when creating a new folder. Each configuration is represented by an entry in this table and is uniquely identified by an ID stored in the CONFIGURATION_ID column. The COMPANY_ID column identifies the company with which the configuration is associated. The DESCRIPTION column stores a textual description of the configuration that allows a user to recognize its characteristics. The SECURITY_ID column indicates the folder security profile id that should be initially applied to the folder and stored in the SECURITY_ID column of the FOLDERS table. The NEW_DOC_SECURITY_ID indicates the value that should be stored in the NEW DOCUMENT_DEFAULT_SECURITY_ID column of the FOLDERS table. The DOC_TYPE_LIST_ID indicates the document type list that will be used for the folder and is the value stored in the DOC_TYPE_LIST_ID column of the FOLDERS table. The IS_DEFAULT column indicates which configuration is the default for a company.

Referring to table 178, FOLDER_NOTES, and as described previously, a user is able to create and associate notes with a folder. Each note is stored as an entry in this table and is assigned a unique ID which is stored in the NOTE_ID column. The FOLDER_ID column indicates the folder with which the note is associated. The DATE_CREATED column stores the date and time at which the note was created. The USER_NAME column stores the name of the user who created the note. The DESCRIPTION column stores the note description or subject line The CONTENT column stores the body of the note.

Referring to table 186, FOLDERS_SECURITY_PROFILES, each company can establish one or more folder security profiles that describe user-level access to a folder. For each profile defined by each company, an entry is made in this table, and a unique identifier is assigned and stored in the SECURITY_ID column. The COMPANY_ID column indicates the company associated with the profile. The DESCRIPTION contains a textual description of the profile that enables a user to more readily recognize its characteristics.

Referring to table 188, FOLDERS_SECURITY_PRO-FILES_ACL, each profile comprises one or more user roles, each of which is assigned permissions. Each role defined for profile is entered in this table and assigned an identifier unique to the profile. The SECURITY_ID indicates the profile with which the role is associated. The ROLE_ID contains the unique identifier of the role in the profile. The ROLE_DESCRIPTION contains a textual description of the role that enables a user to more readily recognize its characteristics. The VIEW_ID column indicates which view, as described below, should be used to present a folder's contents when displaying a folder with the SECURITY_ID to a user who is a member of the role. The CAN_VIEW column indicates if members of the role can view a folder with the associated SECURITY_ID. Likewise, the CAN_DELETE column indicates if members of the role can delete the folder; the CAN_ADD_DOCS column indicates if members of the role can associate new documents with the folder; the CAN_REMOVE_DOCS attribute indicates if members of the role can remove associations between documents and the folder; the CAN_EDIT_PROPERTIES indicates if members of the role can edit the attribute values of the folder, and the CAN_EDIT_SECURITY determines if members of the role can change the security profile associated with the folder.

Referring to table 190, FOLDERS_SECURITY_PROFILES_ROLE_MEMBERS, each user that will be granted any level of access to a folder must first be assigned to one of the roles defined by the security profile applied to that folder. For each such user, an entry must be made in this table. The SECURITY_ID and ROLE_ID columns indicate the profile and role with which the user will be associated. The USER_ID column indicates the user that is being associated.

Referring to table 180, DOCUMENTS_SECURITY_PROFILES, each company can establish one or more document security profiles that describe user-level access to a document. For each profile defined by each company, an entry is made in this table, and a unique identifier is assigned and stored in the SECURITY_ID column. The COMPANY_ID column indicates the company associated with the profile. The DESCRIPTION contains a textual description of the profile that enables a user to more readily recognize its characteristics.

Referring to table 182, DOCUMENTS_SECURITY_PROFILES_ACLS, each profile comprises one or more user roles, each of which is assigned permissions. Each role defined for profile is entered in this table and assigned an identifier that is unique to the profile. The SECURITY_ID indicates the profile with which the role is associated. The ROLE_ID contains the unique identifier of the role in the profile. The ROLE_DESCRIPTION contains a textual description of the role that enables a user to more readily recognize its characteristics. The CAN_VIEW column indicates if members of the role can view a document with the associated SECURITY_ID. Likewise, the CAN_DELETE column indicates if members of the role can delete the document; the CAN_EDIT_PROPERTIES indicates if members of the role can edit the attribute values of the document, and the CAN_EDIT_SECURITY determines if members of the role can change the security profile that is associated with the document.

Referring to table 184, DOCUMENTS_SECURITY_PROFILES_ROLE_MEMBERS, each user that will be granted any level of access to a document must first be assigned to one of the roles defined by the security profile applied to that document. For each such user, an entry must be made in this table. The SECURITY_ID and ROLE_ID columns indicate the profile and role with which the user will be associated. The USER_ID column indicates the user that is being associated.

Referring to table 192, FOLDER_VIEWS, each company can establish one or more views, which describe how the contents of a folder are presented to the user. For each view defined, the system assigns a unique identifier, and an entry is made in this table storing the identifier in the VIEW_ID column. The COMPANY_ID indicates the company with which the view is associated. The DESCRIPTION column contains a textual description of the view definition that enables a user to more readily recognize its characteristics.

Referring to table 194, FOLDER_VIEW_GROUPS, within each view definition, one or more document type groups can be defined. For each group defined in a view, an entry is made in this table. The VIEW_ID column indicates the view to which the group applies. The GROUP_NUMBER contains an identifier for the group that is unique within the view. The DESCRIPTION column contains a textual description of the group.

Referring to table 196, FOLDER_VIEW_DOCTYPE_TO_GROUP_MAP, for each document that appears in a view, its corresponding document type must be mapped to one of the groups in a view. It should be noted that a single view can be used to display the contents of folders that use different document type lists. For each document type and its respective document type list that should be shown in a view group, an entry will be made in table 196. The VIEW_ID indicates the view in which the document type will appear. The DOC_TYPE_LIST_ID column indicates the document type list in which the document type is a member. The DOC_TYPE column indicates the document type that is being associated with a view group. The GROUP_NUMBER column indicates the group with which the document type is being associated. The SORT_ORDER column indicates how the document type should be sorted within the group.

As described previously, a company establishes one or more lists of document types that describe the types of documents typically encountered by that company. Each folder is associated with one of the company's document type lists. Each list defined by a company is stored as an entry in table 198, DOC_TYPE_LISTS. Each list is assigned a unique identifier which is stored LIST_ID. The COMPANY_ID column indicates the company that defined the list. DESCRIPTION provides a textual description of the list.

Referring to table 200, DOC_TYPE_LIST_MEMBERS, each document type list contains one or more members. For each member, an entry is made in this table. The system assigns an identifier that is unique within the list and is stored in the DOC_TYPE column. The LIST_ID column indicates the list in which the document type is a member. The DESCRIPTION column stores a description of the document type as provided by the company. The SORT_ORDER column optionally contains the order in which the document type is sorted within the list.

Each time a user defines a document type notification, as described previously, the system makes an entry in table 214, FILE_ADDED_NOTIFICATIONS. For each notification established, the system generates a unique identifier which is stored in the NOTIFICATION_ID column. The DESCRIPTION column allows the user to optionally provide a description for the notification. The USER_ID column indicates the user that established the notification. The FOLDER_ID column indicates the folder that is associated with the notification. The EMAIL_ADDRESSES column contains a list of email recipients who will receive an email message when the notification is triggered. The RECURRENT column indicates whether the notification is single or recurrent, as described previously. The TARDY_DATETIME column indicates the date and time at which the notification is to be considered tardy, which would cause a tardy notification to be triggered. The TARDY_SIGNALLED column indicates whether a tardy notification has been sent.

For each folder share that is established between two parties, an entry is made in table 216, FOLDER_SHARES. The system assigns a unique identifier to each share and stores the identifier in the FOLDER_SHARE_ID column. The DATE_CREATED column indicates the date and time at which the share was initiated. The CREATED_BY_USER_ID column indicates the user that initiated the share. The SOURCE_FOLDER_ID column identifies the source folder for the share. The DESTINATION_COMPANY_ID column indicates the company with which documents are being shared (i.e., the receiving party). The ACCEPTED_BY_USER_ID column identifies the user who accepted the share on behalf of the receiving company. The DESTINATION_FOLDER_ID identifies the destination folder for the share (the folder to which documents are applied). The RECURRENT_SHARE_PROFILE_ID column indicates the sharing profile which specifies the list of document types to be included in a recurring share, as described below. The STATUS column indicates the current status of the share, that can include values for initiated, accepted, declined and pended.

When a share is established, the sharing company may indicate that a specific list of documents be applied to the destination folder. For each such document, an entry is made in table 206, FOLDER_SHARE_DOCUMENTS. The FOLDER_SHARE_ID column indicates the associated share. The DOCUMENT_ID column indicates the document to be shared. The DOC_TYPE_ID indicates the document's type at the time the share was initiated.

When a recurrent share is established, the sharing party must specify one or more document types to be applied to the receiving party's folder. While the user can specify a new list of document types each time a share is created, the system allows each company to establish a type list that can be reused and applied to multiple shares to facilitate this selection process. For each list of document types associated with a recurring share, an entry is made in table 208, FOLDER_SHARE_PROFILES. The system assigns each profile a unique identifier which is stored in the SHARE_PROFILE_ID column. The DESCRIPTION column stores a textual description of the list. The DOC_TYPE_LIST_ID column identifies the document type list that is associated with the profile. The IS_GLOBAL column indicates whether the profile is made available as a pre-defined list or if it is associated with only a single share. For each document type included in a share profile list, an entry is made in table 210, FOLDER_SHARE_PROFILE_DOC_TYPES. The SHARE_PROFILE_ID column indicates the profile in which the document type is included, and the DOC_TYPE_ID indicates the document type to be included.

Referring to table 212, COMPANY_FOLDER_ATTRIBUTE_MAPS, the system can maintain a mapping between the folder attributes of two companies. Such a mapping can be used during the document sharing process to automatically assign attribute values to the receiving party's folder. For each attribute in one company's folder attributes that corresponds to an attribute in another company's folder attribute, an entry is made in this table. The SOURCE_COMPANY_ID indicates the company associated with the source attribute. The SOURCE_ATTRIBUTE_ID identifies the source attribute. The DESTINATION_COMPANY_ID indicates the company associated with the corresponding destination attribute. The DESTINATION_ATTRIBUTE_ID identifies the corresponding destination attribute.

The default mapping of document types between two document type lists is defined in table 202, DOCUMENT_TYPE_LIST_MAPS. As described above, each document is stored in the repository in association with a folder and a document type. If a transaction party wishes to share that document with another transaction party, the receiving transaction party will view the document through its own folder. Since the two parties may not have identically-defined document lists, the default map in table 202 defines how each document image having a given document type in the type list for the sharing transaction party is placed in a document type and list as viewed by the receiving transaction party. Table 202 therefore identifies each combination of document type identifiers and document type list identifiers and associates each combination with a destination document type identifier and document type list identifier combination.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A system for managing data items at an electronic data repository with respect to a plurality of parties, the system comprising:
   an electronic data repository; and
   a computer processor programmed to
      receive a plurality of data items (received data items) from one or more parties of a plurality of parties remote from the repository and remote from each other,
      store the received data items in the repository, and
      for each first remote party of the plurality of remote parties,
         provide the first remote party access to said received data items that are within a data item set corresponding to the first remote party,
         prohibit the first remote party from modifying a first data item of the received data items in the repository, and from deleting the first data item from the repository, while the first data item is part of a data item set of another remote party of the plurality of remote parties, and
         responsively to the first remote party, permit a second remote party of the plurality of remote parties access, in a data item set corresponding to the second remote party, to first data items that are in the data item set corresponding to the first remote party, and thereafter permit a third remote party of the plurality of remote parties access to the first data items responsively to the second remote party.

2. The system as in claim 1, wherein the programmed processor applies a categorization of the received data items within each data item set corresponding to each remote party of the plurality of remote parties.

3. The system as in claim 2, wherein definition of the categorization applied within a first said data item set is selectable through the programmed processor by the remote party to which the first data item set corresponds.

4. The system as in claim 2, wherein the programmed processor maintains a map that correlates the categorization applied within the data item set corresponding to the first remote party to the categorization applied within the data item set corresponding to the second remote party and wherein the programmed processor applies the first data items in the data item set corresponding to the first remote party to the data item set corresponding to the second remote party according to the map.

5. The system as in claim 4, wherein the second remote party defines the map.

6. The system as in claim 5, wherein the map is predefined.

7. The system as in claim 4, wherein received data items subsequently stored in the data item set corresponding to the first remote party are automatically applied to the data item set corresponding to the second remote party.

8. The system as in claim 7, wherein the programmed processor applies received data items in the data item set corresponding to the first remote party to data item sets corresponding a plurality of said second remote parties according to the map.

9. The system as in claim 7, wherein the programmed processor applies received data items in the data item set corresponding to the first remote party to a data item set corresponding to a single said second remote party according to the map.

10. The system as in claim 1, wherein, responsively to a fourth remote party of the plurality of remote parties, the programmed processor defines types of data items of the received data items that are needed to complete a first data item set corresponding to the fourth remote party, and wherein the programmed processor notifies the fourth remote party when all the needed types of data items are stored in the repository for the first data item set.

11. The system as in claim 1, wherein, responsively to a fourth remote party of the plurality of remote parties, the programmed processor defines types of data items of the received data items that are needed to complete a first data item set corresponding to the fourth remote party, and wherein the programmed processor notifies the fourth remote party if the needed types of data items are not stored in the repository for the first data item set by a predefined time.

12. The system as in claim 1, wherein, responsively to a fourth remote party of the plurality of remote parties, the programmed processor monitors predetermined data items of the received data items, and wherein the programmed processor notifies the fourth remote party when each of the monitored data items is stored in the repository.

13. The system as in claim 1, wherein, after permitting the second remote party access to the first data items in the data item set of the first remote party, the programmed processor automatically applies data items in the data item set corresponding to the first remote party to the data item set corresponding to the second remote party.

14. The system as in claim 1 wherein
when the programmed processor permits the second remote party access to the first data items in the data item set corresponding to the first remote party, the programmed processor applies the first data items in the data item set corresponding to the first remote party to the data item set corresponding to the second remote party, the programmed processor permits each first remote party to exclude selected received data items from the data item set corresponding to the first remote party, and exclusion from the data item set corresponding to the first remote party of a said selected received data item that has been applied to the data item set corresponding to the second remote party does not exclude the applied selected received data item from the data item set corresponding to the second remote party.

15. A system for managing documents at an electronic data repository, where the documents relate to a transaction involving a plurality of parties having different roles in the transaction, the system comprising:
an electronic data repository; and
a computer program configured to
receive a plurality of documents (received documents) from one or more parties of a plurality of parties that are involved in the transaction and that are remote from the repository and from each other,
store the received documents in the repository, and
for each first remote party of the plurality of remote parties,
define, responsively to instructions from the first remote party, a document set corresponding to the first remote party, wherein the document set includes one or more predetermined types of the received documents,
permit the first remote party access to said received documents that are within the document set corresponding to the first remote party,
prohibit the first remote party from modifying any first document of the received documents in the repository, and from deleting the first document from the repository, while the first document is part of a document set of another remote party of the plurality of remote parties, and
responsively to the first remote party, permit a second remote party of the plurality of remote parties access, in a document set corresponding to the second remote party, to first documents that are in the document set corresponding to the first remote party, and thereafter permit a third remote party of the plurality of remote parties access to the first documents responsively to the second remote party.

16. The system as in claim 15, wherein the computer program maintains a map that correlates the document set corresponding to the first remote party to the document set corresponding to the second remote party and wherein the computer program applies the received documents in the document set corresponding to the first remote party to the document set corresponding to the second remote party according to the map.

17. The system as in claim 16,
wherein, responsively to each first remote party, the computer program applies a categorization of the predetermined types of the received documents within the document set corresponding to the first remote party,
wherein the map defines a correspondence between the categorization of the predetermined types of received documents within the document set corresponding to the first remote party and the categorization of the predetermined types of received documents within the document set corresponding to the second remote party, and wherein the computer program applies one or more received documents included in the document set corresponding to the first remote party to the document set corresponding to the second remote party according to the map.

18. The system as in claim 16, wherein, following initially applying the received documents in the document set corresponding to the first remote party to the document set corresponding to the second remote party according to the map, the computer program automatically applies received documents subsequently stored in the document set corresponding to the first remote party to the document set corresponding the second remote party according to the map.

19. The system as in claim 15, wherein after the computer program permits the second remote party access to the first documents in the document set corresponding to the first remote party, the computer program applies the first documents in the document set corresponding to the first remote party to the document set corresponding to the second remote party, the computer program permits each first remote party to exclude selected received documents from the document set corresponding to the first remote party, and exclusion from the document set corresponding to the first remote party of a said selected received document that has been applied to the document set corresponding to the second remote party does not exclude the applied selected received document from the document set corresponding to the second remote party.

20. The system as in claim 15, wherein a fourth said remote party comprises a plurality of non-remote entities, and wherein the computer program defines, responsively to the fourth remote party, access rights among the non-remote entities by which the non-remote entities access the received documents within a document set corresponding to the fourth remote party.

21. A system for collecting data items at an electronic data repository from a plurality of parties, with each of the parties having access to the data items from the repository, the system comprising:

means for storing data items in an electronic format;

means for receiving a plurality of data items (received data items) from one or more parties of a plurality of parties remote from the repository and from each other;

means for storing the received data items in the repository;

means for providing each first remote party of the plurality of remote parties access to said received data items that are within a data item set corresponding to the first remote party;

means for prohibiting the first remote party from modifying any first data item of the received data items in, and from deleting the first data item from, the repository while the first data item is part of a data item set of another remote party of the plurality of remote parties; and means for permitting, responsively to the first remote party, a second remote party of the plurality of remote parties access, in a data item set corresponding to the second remote party, to first data items that are in the data item set corresponding to the first remote party, and thereafter permitting a third remote party of the plurality of remote parties access to the first data items responsively to the second remote party.

22. A computerized method for managing data items at an electronic data repository with respect to a plurality of parties, the method comprising:

receiving a plurality of data items (received data items) from one or more parties of a plurality of parties remote from the repository and from each other;

storing the received data items in the repository in an electronic format; and for each first remote party of the plurality remote parties, providing the first remote party access to said received data items that are within a data item set corresponding to the first remote party, prohibiting the first remote party from modifying a first data item of the received data items in the repository, and from deleting the first data item from the repository, while the first data item is part of a data item set of another remote party of the plurality of remote parties, and permitting, responsively to the first remote party, a second remote party of the plurality of remote parties access, in a data item set corresponding to the second remote party, to first data items that are in the data item set corresponding to the first remote party, and thereafter permitting a third remote party of the plurality of remote parties access to the first data items responsively to the second remote party.

23. The method as in claim 22, including applying a categorization of the received data items within each data item set corresponding to each remote party of the plurality of remote parties.

24. The method as in claim 23, wherein each first remote party defines a said categorization of the received data items within each data item set corresponding to the first remote party.

25. The method as in claim 23, wherein the permitting step includes applying the first data items in the data item set corresponding to the first remote party to the data item set corresponding to the second remote party according to a map that correlates the categorization of received data items within the data item set of the first remote party to the categorization of received data items within the data item set corresponding to the second remote party.

26. The method as in claim 23, including applying a map between the categorization of received data items within the data item set corresponding to the first remote party and the categorization of received data items within the data item set corresponding to the second remote party, and wherein the permitting step includes applying the received data items of the data item set corresponding to the first remote party to the data item set corresponding to the second remote party according to the map.

27. The method as in claim 22, including responsively to a fourth remote party of the plurality of remote parties, defining types of data items of the received data items that are needed to complete a first data item set corresponding to the fourth remote party, and automatically notifying the fourth remote party when the needed types of data items are stored in the repository for the first data item set.

28. The method as in claim 22, including, responsively to a fourth remote party of the plurality of remote parties, defining types of data items of the received data items that are needed to complete a first data item set corresponding to the fourth remote party, and automatically notifying the fourth remote party if the needed types of data items are not stored in the repository for the first data item set by a predefined time.

29. The method as in claim 22, including, after the permitting step, automatically applying data items in the data item set corresponding to the first remote party to the data item set corresponding to the second remote party.

30. The method as in claim 22, including permitting each first remote party to exclude selected received data items from the data item set corresponding to the first remote party, and wherein exclusion from the data item set corresponding to the first remote party of a said selected received data item that has been applied to the data item set corresponding to the second remote party does not exclude the applied selected received data item from the data item set corresponding to the second remote party.

31. The method as in claim 22, wherein the providing step includes providing the data items to each remote party in PDF format.

32. The method as in claim 22, wherein the providing step includes providing each first remote party access to the data items over the Internet.

33. The method as in claim 22, wherein the permitting step includes applying the first data items in the data item set corresponding to the first remote party to the data item set corresponding to the second remote party, each first remote party is permitted to exclude selected received data items from the data item set corresponding to the first remote party, and wherein exclusion by the first remote party from the data item set corresponding to the first remote party of a selected received data item that has been applied to the data item set corresponding to the second remote party in the applying step does not exclude the applied selected received data item from the data item set corresponding to the second remote party.

34. The method as in claim 22, wherein the repository includes an SQL database.

35. Within a transaction involving a plurality of parties having different roles in the transaction, a computerized method for managing documents related to the transaction and controlling access to the documents, the method comprising:

receiving a plurality of documents (received documents) relating to the transaction from one or more parties of a plurality of parties that are involved in the transaction;

storing the received documents in an electronic data repository, wherein said one or more parties are remote from the repository and from each other, wherein the documents are applied to one or more document sets corresponding to respective remote parties, and wherein each said document set includes one or more predetermined types of said received documents; and for each first remote party of the plurality of remote parties, providing the first remote party access to said received documents that are within a document set corresponding to the first remote party, prohibiting the first remote party from modifying any first document of the received documents in, and from deleting the first document from, the repository while the first document is part of a document set of another remote party of the plurality of remote parties, and permitting, responsively to the first remote party, a second remote party of the plurality of remote parties access, in a document set corresponding to the second remote party, to first documents in the document set corresponding to the first remote party, and thereafter permitting a third remote party of the plurality of remote parties access to the first documents responsively to the second remote party.

36. The method as in claim 35, wherein each first remote party defines a categorization of the predetermined types of the received documents within each document set corresponding to the first remote party, including maintaining a map that defines a correspondence between the categorization of the predetermined document types within the document set corresponding to the first remote party and the categorization of the predetermined document types within the document set corresponding to the second remote party, and wherein the permitting step includes applying one or more received documents included in the document set corresponding to the first remote party to the document set corresponding to the second remote party according to the map.

37. The method as in claim 36, wherein, following initially applying the one or more received documents included in the document set corresponding to the first remote party to the document set corresponding to the second remote party according to the map, subsequent received documents stored in the document set corresponding to the first remote party are automatically applied to the document set corresponding to the second remote party according to the map.

38. The method as in claim 35, wherein a fourth said remote party includes a plurality of non-remote entities, and wherein the fourth remote party defines access rights among the non-remote entities by which the non-remote entities access the received documents within a document set corresponding to the fourth remote party.

39. The method as in claim 35, wherein the permitting step includes applying the received documents in the document set corresponding to the first remote party to the document set corresponding to the second remote party, wherein the first remote party of the plurality of remote parties is permitted to exclude selected received documents from said document set corresponding to the first remote party, and wherein exclusion from the document set corresponding to the first remote party of a selected received document that has been applied to the document set corresponding to the second remote party in the applying step does not exclude the applied selected received document from the document set corresponding to the second remote party.

40. Within a transaction involving a plurality of parties having different roles in the transaction, a computerized method for managing documents related to the transaction and controlling access to the documents, the method comprising:

(a) providing an electronic data repository;

(b) receiving a plurality of documents (received documents) relating to the transaction from one or more parties of a plurality of parties remote from the repository and from each other and having a role in the transaction;

(c) storing the received documents in electronic form in the repository; and (d) for each first remote party of the plurality of remote parties, defining a document set corresponding to the first remote party, wherein the document set includes one or more predetermined types of the received documents and wherein the first remote party defines a categorization of the one or more predetermined of the received document types within the document set corresponding to the first remote party, providing each first remote party access to said received documents that are within the document set corresponding to the first remote party, organized by the categorization defined by the first remote party, prohibiting any first remote party from modifying any first document of the received documents in, and from deleting the first document from, the repository while the first document is part of a document set of another remote party of the plurality of remote parties, maintaining a map that defines a correspondence between the categorization of the one or more predetermined types of the received documents within the document set corresponding to a first remote party and the categorization of the one or more predetermined types of the received documents within a document set corresponding to a second remote party of the plurality of remote parties, following the maintaining step and responsively to the first remote party, applying one or more received first documents included in the document set corresponding to the first remote party to the document set corresponding to the second remote party according to the map, and responsively to the second remote party, applying the one or more received first documents to a document set corresponding to a third remote party of the plurality of remote parties.

41. The method as in claim 40, wherein each first remote party is permitted to exclude selected received documents from said document set corresponding to the first remote party, and wherein exclusion from the document set corresponding to the first remote party of a selected received document that has been applied to the document set corresponding to the second remote party in the applying step does not exclude the applied selected received document from the document set corresponding to the second remote party.

42. A computerized method of sharing documents relating to a mortgage transaction involving a plurality of parties having different roles in the transaction, the method comprising:

(a) providing an electronic data repository;

(b) receiving a plurality of documents (received documents) relating to the mortgage transaction from one or more parties of a plurality of parties that are remote from the repository, are remote from each other and have a role in the mortgage transaction;

(c) wherein each first remote party defines types of documents applicable to a document set corresponding to the first remote party;

(d) storing the documents received at step (b) in electronic form in the repository;

(e) applying each received document to one or more said document sets according to the document types defined at step (c);

(f) prohibiting any first remote party from deleting any first received document from the repository while the first document is part of a document set of another remote party of the plurality of remote parties;

(g) providing each first remote party access to said received documents that are within the document set corresponding to the first remote party;

(h) responsively to the first remote party, applying one or more first documents in the document set corresponding to the first remote party to a document set corresponding to a second remote party of the plurality of remote parties; and (i) responsively to the second remote party, applying the one or more first documents to a document set corresponding to a third remote party of the plurality of remote parties.

43. A computer readable carrier including a computer program that causes a computer to manage and control access to documents at an electronic data repository used by a plurality of parties to a transaction, the computer program causing the computer to perform the steps of:

(a) receiving a plurality of documents (received documents) from one or more parties of a plurality of parties remote from the repository and from each other;

(b) storing the received documents in the repository in an electronic format;

(c) for each first remote party of the plurality of remote parties, providing the first remote party access to received documents within a document set corresponding to first the remote party, wherein said document set includes one or more predetermined types of said received documents, prohibiting the first remote party from modifying any first document of the received documents in the repository, and from deleting the first document from the repository, while the first document is part of a document set of another remote party of the plurality of remote parties, and permitting, responsively to the first remote party, a second remote party of the plurality of remote parties access, in a document set corresponding to the second remote party, to first documents that are in the document set corresponding to the first remote party, and thereafter permitting a third remote party of the plurality of remote parties access to the second documents responsively to the second remote party.

44. The carrier as in claim 43, wherein the computer program defines a categorization of the predetermined types of the received documents within the document set corresponding to the first remote party, wherein the computer program maintains a map that defines a correspondence between the categorization of the predetermined document types within the document set corresponding to the first remote party and the categorization of the predetermined document types within the document set corresponding to the second remote party, and wherein, in the permitting step, the computer program applies one or more received documents included in the document set corresponding to the first remote party to the document set corresponding to the second remote party according to the map.

45. The carrier as in claim 44, wherein, following initially applying the one or more received documents included in the document set corresponding to the first remote party to the document set corresponding to the second remote party according to the map, the computer program automatically applies received documents subsequently stored in the document set corresponding to the first remote party to the document set corresponding to the second remote party according to the map.

46. The carrier as in claim 43, wherein the permitting step includes applying the received documents in the document set corresponding to the first remote party to the document set corresponding to the second remote party, wherein each first remote party is permitted to exclude selected received documents from the document set corresponding to the first remote party, and wherein exclusion from the document set corresponding to the first remote party of a said selected received document that has been applied to the document set corresponding to the second remote party does not exclude the applied selected received document from the document set corresponding to the second remote party.

47. A computerized method of sharing documents relating to a mortgage transaction involving a plurality of parties having different roles in the transaction, the method comprising:

(a) providing an electronic data repository that is accessible by a plurality of parties that are remote from the repository, are remote from each other and have a role in the mortgage transaction;

(b) receiving one or more documents relating to the mortgage transaction from one or more said remote parties;

(c) storing the documents received at step (b) in electronic form in the repository;

(d) permitting access to the received one or more documents by a first said remote party having a first role in the mortgage transaction;

(e) prohibiting any said remote party from modifying any document in the repository received from a remote party at step (b) and to which access is permitted at step (d); and (f) responsively to the first remote party, permitting access by a second said remote party to one or more documents received from said first remote party at (b), wherein the second remote party has a second role in the mortgage transaction subsequent to the first role.

48. The method as in claim 47, including permitting, responsively to the second remote party, access by a third said remote party to one or more said documents received from the first remote party at (b), wherein the third remote party has a third role in the mortgage transaction subsequent to the second role.

49. The method as in claim 48, including applying a categorization of the received documents to which each remote party has access.

50. The method as in claim 49, wherein each remote party of the plurality of remote parties defines a said categorization of the received documents to which the remote party has access.

51. The method as in claim 47, including responsively to a third said remote party, defining types of documents of the received documents that are needed to complete a first document set corresponding to the third remote party, and automatically notifying the third remote party when the needed types of documents are stored in the repository for the first document set.

52. The method as in claim 47, including, responsively to a third said remote party, defining types of documents of the received documents that are needed to complete a first document set corresponding to the third remote party, and automatically notifying the third remote party if the needed types of documents are not stored in the repository for the first document set by a predefined time.

* * * * *